United States Patent
Togashi et al.

(10) Patent No.: US 7,388,737 B2
(45) Date of Patent: *Jun. 17, 2008

(54) MULTILAYER CAPACITOR AND METHOD OF ADJUSTING EQUIVALENT SERIES RESISTANCE OF MULTILAYER CAPACITOR

(75) Inventors: Masaaki Togashi, Nikaho (JP); Taisuke Ahiko, Nikaho (JP)

(73) Assignee: TDK Corporation, Tokyo (JP)

( * ) Notice: Subject to any disclaimer, the term of this patent is extended or adjusted under 35 U.S.C. 154(b) by 308 days.

This patent is subject to a terminal disclaimer.

(21) Appl. No.: 11/298,761

(22) Filed: Dec. 12, 2005

(65) Prior Publication Data

US 2006/0152886 A1 Jul. 13, 2006

(30) Foreign Application Priority Data

Jan. 13, 2005 (JP) .............................. 2005-006644

(51) Int. Cl.
H01G 4/228 (2006.01)
H01G 4/005 (2006.01)
(52) U.S. Cl. .................... 361/306.3; 361/303; 29/25.42
(58) Field of Classification Search ................ 361/303, 361/311, 306.1, 306.3, 307, 308.1, 309; 29/25.42
See application file for complete search history.

(56) References Cited

U.S. PATENT DOCUMENTS

| | | | | |
|---|---|---|---|---|
| 5,369,545 A | * | 11/1994 | Bhattacharyya et al. | 361/306.2 |
| 6,191,932 B1 | * | 2/2001 | Kuroda et al. | 361/303 |
| 6,327,134 B1 | * | 12/2001 | Kuroda et al. | 361/303 |
| 6,370,010 B1 | * | 4/2002 | Kuroda et al. | 361/306.1 |
| 6,771,484 B2 | * | 8/2004 | Kuroda et al. | 361/306.1 |
| 6,909,593 B2 | * | 6/2005 | Kuroda et al. | 361/306.3 |
| 7,298,604 B2 | * | 11/2007 | Togashi et al. | 361/306.3 |
| 2002/0041006 A1 | * | 4/2002 | Ahiko et al. | 257/532 |

FOREIGN PATENT DOCUMENTS

JP  A 2004-47983  2/2004

* cited by examiner

Primary Examiner—Eric Thomas
(74) Attorney, Agent, or Firm—Oliff & Berridge, PLC

(57) ABSTRACT

A multilayer capacitor has a multilayer body in which multiple dielectric layers and multiple inner electrodes are alternately laminated, and multiple terminal electrodes formed on the multilayer body. The multiple inner electrodes include multiple first inner electrodes and multiple second inner electrodes alternately arranged. The multiple terminal electrodes include first and second terminal electrodes electrically insulated from each other. The multiple first inner electrodes are electrically connected to each other by way of a through-hole conductor. The multiple second inner electrodes are electrically connected to each other by way of a through-hole conductor.

16 Claims, 27 Drawing Sheets

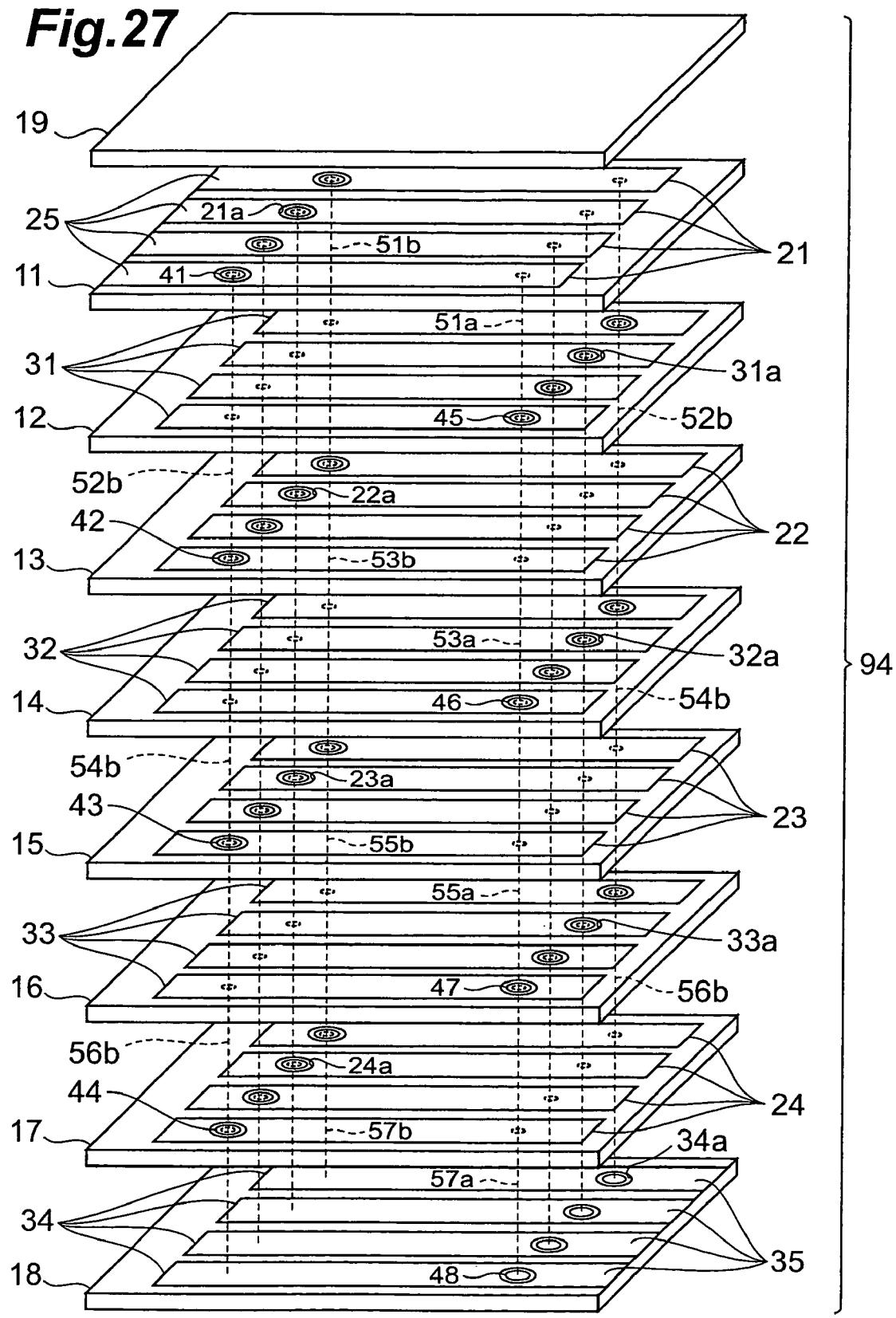

MULTILAYER CAPACITOR AND METHOD OF ADJUSTING EQUIVALENT SERIES RESISTANCE OF MULTILAYER CAPACITOR

BACKGROUND OF THE INVENTION

1. Field of the Invention

The present invention relates to a multilayer capacitor and a method of adjusting an equivalent series resistance of a multilayer capacitor.

2. Related Background Art

Known as this kind of multilayer capacitor is one comprising a multilayer body in which a plurality of dielectric layers and a plurality of inner electrodes are alternately laminated, and a plurality of terminal electrodes formed on the multilayer body (see, for example, Japanese Patent Application Laid-Open No. 2004-47983).

Power supplies for central processing units (CPUs) mounted in digital electronic devices have been increasing their load current while lowering their voltage. Therefore, it has become quite difficult to suppress the fluctuation in power supply voltage under a tolerable level in response to a drastic change in load current, whereby a multilayer capacitor known as decoupling capacitor has come into use so as to be connected to a power supply. At the time when the load current fluctuates transiently, the multilayer capacitor supplies a current to the CPU, thereby suppressing the fluctuation of the power supply voltage.

In recent years, as the CPUs have further been raising their operating frequencies, the load current has been becoming faster and greater. Therefore, the multilayer capacitor used in the decoupling capacitor is demanded to increase its capacity and equivalent series resistance (ESR). The multilayer capacitor disclosed in Japanese Patent Application Laid-Open No. 2004-47983 employs a terminal electrode having a multilayer structure including an inner resistance layer, thereby increasing the ESR.

SUMMARY OF THE INVENTION

However, the following problem exists in the multilayer capacitor disclosed in Japanese Patent Application Laid-Open No. 2004-47983 when adjusting the equivalent series resistance to a desirable value. Namely, for adjusting the equivalent series resistance to a desirable value, the multilayer capacitor disclosed in Japanese Patent Application Laid-Open No. 2004-47983 must regulate the thickness of the inner resistance layer included in the terminal electrode and the material composition of the inner resistance layer, which makes it quite difficult to regulate the equivalent series resistance.

It is an object of the present invention to provide a multilayer capacitor and a method of adjusting an equivalent series resistance of a multilayer capacitor, which can regulate the equivalent series resistance easily with a high precision.

In a typical multilayer capacitor, all the inner electrodes are connected to their corresponding terminal electrodes by way of lead conductors. Consequently, the lead conductors exist by the number of inner electrodes, thereby lowering the equivalent series resistance. As the number of layers of the dielectric layers and inner electrodes is made greater in order to increase the capacity of the multilayer capacitor, the number of lead conductors becomes greater. Since resistance components of lead conductors are connected to the terminal electrodes in parallel, the equivalent series resistance of the multilayer capacitor further decreases as the number of lead conductors increases. Thus, the demand for increasing the capacity of the capacitor and the demand for increasing the equivalent series resistance contradict each other.

Therefore, the inventors diligently conducted studies about multilayer capacitors which can satisfy both of the demands for increasing the capacity and equivalent series resistance. As a result, the inventors have found a new fact that, even when the number of dielectric layers and the number of laminated inner electrodes are the same, the equivalent series resistance can be adjusted to a desirable value if the inner electrodes are connected to each other with a through-hole conductor while making it possible to change the number of lead conductors. The inventors have also found a new fact that the equivalent series resistance can be adjusted to a desirable value if the inner electrodes are connected to each other with a through-hole conductor while making it possible to change positions of lead conductors in the laminating direction of the multilayer body. When the number of lead conductors is made smaller than that of inner electrodes in particular, the adjustment can be made such as to increase the equivalent series resistance.

In view of such results of studies, in one aspect, the present invention provides a multilayer capacitor comprising a multilayer body in which a plurality of dielectric layers and a plurality of inner electrodes are alternately laminated, and a plurality of terminal electrodes formed on the multilayer body; wherein the plurality of inner electrodes include a plurality of first inner electrodes and a plurality of second inner electrodes alternately arranged; wherein the plurality of terminal electrodes include first and second terminal electrodes electrically insulated from each other; wherein the plurality of first inner electrodes are electrically connected to each other by way of a through-hole conductor; wherein the plurality of second inner electrodes are electrically connected to each other by way of a through-hole conductor; wherein, in the plurality of first inner electrodes, at least one first inner electrode whose number is smaller than the total number of first inner electrodes by at least 1 is electrically connected to the first terminal electrode by way of a lead conductor; wherein, in the plurality of second inner electrodes, at least one second inner electrode whose number is smaller than the total number of second inner electrodes by at least 1 is electrically connected to the second terminal electrode by way of a lead conductor; and wherein an equivalent series resistance is set to a desirable value by adjusting each of the number of first inner electrodes electrically connected to the first terminal electrode by way of the lead conductor and the number of second inner electrodes electrically connected to the second terminal electrode by way of the lead conductor.

In another aspect, the present invention provides a method of adjusting an equivalent series resistance of a multilayer capacitor comprising a multilayer body in which a plurality of dielectric layers sand a plurality of inner electrodes are alternately laminated, and a plurality of terminal electrodes formed on the multilayer body; wherein the plurality of inner electrodes include a plurality of first inner electrodes and a plurality of second inner electrodes alternately arranged; wherein the plurality of terminal electrodes include first and second terminal electrodes electrically insulated from each other; the method comprising the steps of electrically connecting the plurality of first inner electrodes to each other by way of a through-hole conductor; electrically connecting the plurality of second inner electrodes to each other by way of a through-hole conductor; electrically connecting, in the plurality of first inner electrodes, at least one first inner electrode whose number is smaller than the total number of first inner electrodes by at least 1 to the first terminal electrode by way of a lead conductor; electrically connecting, in the plurality of second inner electrodes, at least one second inner electrode whose number is smaller than the total number of second inner electrodes by at least 1 to the second terminal electrode by way of a lead conductor; and setting the equivalent series resistance to a desirable value by adjusting each of the number of first inner electrodes electrically connected to the first terminal electrode by way of the lead conductor and the number of second inner electrodes electrically connected to the second terminal electrode by way of the lead conductor.

By adjusting each of the number of first inner electrodes electrically connected to the first terminal electrode by way of the lead conductor and the number of second inner electrodes electrically connected to the second terminal electrode by way of the conductor each of the multilayer capacitor and method of adjusting an equivalent series resistance of a multilayer capacitor in accordance with these aspects of the present invention sets the equivalent series resistance to a desirable value and thus can regulate the equivalent series resistance easily with a high precision.

In still another aspect, the present invention provides a multilayer capacitor comprising a multilayer body in which a plurality of dielectric layers and a plurality of inner electrodes are alternately laminated, and a plurality of terminal electrodes formed on the multilayer body; wherein the plurality of inner electrodes include a plurality of first inner electrodes and a plurality of second inner electrodes alternately arranged; wherein the plurality of terminal electrodes include first and second terminal electrodes electrically insulated from each other; wherein the plurality of first inner electrodes are electrically connected to each other by way of a through-hole conductor; wherein the plurality of second inner electrodes are electrically connected to each other by way of a through-hole conductor; wherein, in the plurality of first inner electrodes, at least one first inner electrode whose number is smaller than the total number of first inner electrodes by at least 1 is electrically connected to the first terminal electrode by way of a lead conductor; wherein, in the plurality of second inner electrodes, at least one second inner electrode whose number is smaller than the total number of second inner electrodes by at least 1 is electrically connected to the second terminal electrode by way of a lead conductor; and wherein an equivalent series resistance is set to a desirable value by adjusting each of a position of the first inner electrode electrically connected to the first terminal electrode by way of the lead conductor in the laminating direction of the multilayer body and a position of the second inner electrode electrically connected to the second terminal electrode by way of the lead conductor in the laminating direction of the multilayer body.

In still another aspect, the present invention provides a method of adjusting an equivalent series resistance of a multilayer capacitor comprising a multilayer body in which a plurality of dielectric layers and a plurality of inner electrodes are alternately laminated, and a plurality of terminal electrodes formed on the multilayer body; wherein the plurality of inner electrodes include a plurality of first inner electrodes and a plurality of second inner electrodes alternately arranged; wherein the plurality of terminal electrodes include first and second terminal electrodes electrically insulated from each other; the method comprising the steps of electrically connecting the plurality of first inner electrodes to each other by way of a through-hole conductor; electrically connecting the plurality of second inner electrodes to each other by way of a through-hole conductor; electrically connecting, in the plurality of first inner electrodes, at least one first inner electrode whose number is smaller than the total number of first inner electrodes by at least 1 to the first terminal electrode by way of a lead conductor; electrically connecting, in the plurality of second inner electrodes, at least one second inner electrode whose number is smaller than the total number of second inner electrodes by at least 1 to the second terminal electrode by way of a lead conductor; and setting the equivalent series resistance to a desirable value by adjusting each of a position of the first inner electrode electrically connected to the first terminal electrode by way of the lead conductor in the laminating direction of the multilayer body and a position of the second inner electrode electrically connected to the second terminal electrode by way of the lead conductor in the laminating direction of the multilayer body.

By adjusting each of a position of the first inner electrode electrically connected to the first terminal electrode by way of the lead conductor in the laminating direction of the multilayer body and a position of the second inner electrode electrically connected to the second terminal electrode by way of the lead conductor in the laminating direction of the multilayer body, each of the multilayer capacitor and method of adjusting an equivalent series resistance of a multilayer capacitor in accordance with these aspects of the present invention sets the equivalent series resistance to a desirable value and thus can regulate the equivalent series resistance easily with a high precision.

Preferably, each of the number of through-hole conductors electrically connecting the plurality of first inner electrodes to each other and the number of through-hole conductors electrically connecting the plurality of second inner electrodes to each other is further adjusted, so as to set the equivalent series resistance to the desirable value. In this case, the equivalent series resistance can be regulated with a higher precision.

Preferably, the plurality of first inner electrodes are connected in parallel, and the plurality of second electrodes are connected in parallel. In this case, even when the ohmic value fluctuates among the first or second inner electrodes, its influence on the equivalent series resistance of the multilayer capacitor as a whole is small, whereby the equivalent series resistance regulation can be restrained from lowering its precision.

In still another aspect, the present invention provides a multilayer capacitor comprising a multilayer body in which a plurality of dielectric layers and a plurality of inner electrodes are alternately laminated, and a plurality of terminal electrodes formed on the multilayer body; the multilayer capacitor having a capacitor portion including a first number of first inner electrodes and a second number of second inner electrodes alternately arranged as the plurality of inner electrodes; wherein the plurality of terminal electrodes include first and second terminal electrodes electrically insulated from each other; wherein the first number of first inner electrodes are electrically connected to each other by way of a through-hole conductor; wherein the second number of second inner electrodes are electrically connected to each other by way of a through-hole conductor; wherein, in the first number of first inner electrodes, at least one first inner electrode whose number is smaller than the first number by at least 1 is electrically connected to the first terminal electrode by way of a lead conductor; wherein, in the second number of second inner electrodes, at least one second inner electrode whose number is smaller than the second number by at least 1 is electrically connected to the second terminal electrode by way of a lead conductor; and wherein an equivalent series resistance is set to a desirable value by adjusting each of the number of first inner electrodes electrically connected to the first terminal electrode by way of the lead conductor and the number of second inner electrodes electrically connected to the second terminal electrode by way of the lead conductor.

In still another aspect, the present invention provides a method of adjusting an equivalent series resistance of a multilayer capacitor comprising a multilayer body in which a plurality of dielectric layers and a plurality of inner electrodes are alternately laminated, and a plurality of terminal electrodes formed on the multilayer body; the multilayer capacitor having a capacitor portion including a first number of first inner electrodes and a second number of second inner electrodes alternately arranged as the plurality of inner electrodes; wherein the plurality of terminal electrodes include first and second terminal electrodes electrically insulated from each other; the method comprising the steps of electrically connecting the first number of first inner electrodes to each other by way of a through-hole conductor; electrically connecting the second number of second inner electrodes to each other by way of a through-hole conductor; electrically connecting, in the first number of first inner electrodes, at least one first inner electrode whose number is smaller than the first number by at least 1 to the first terminal electrode by way of a lead conductor; electrically connecting, in the second number of second inner electrodes, at least one second inner electrode whose number is smaller than the second number by at least 1 to the second terminal electrode by way of a lead conductor; and setting the equivalent series resistance to a desirable value by adjusting each of the number of first inner electrodes electrically connected to the first terminal electrode by way of the lead conductor and the number of second inner electrodes electrically connected to the second terminal electrode by way of the lead conductor.

By adjusting each of the number of first inner electrodes electrically connected to the first terminal electrode by way of the lead conductor and the number of second inner electrodes electrically connected to the second terminal electrode by way of the lead conductor, each of the multilayer capacitor and method of adjusting an equivalent series resistance of a multilayer capacitor in accordance with these aspects of the present invention sets the equivalent series resistance to a desirable value and thus can regulate the equivalent series resistance easily with a high precision.

In still another aspect, the present invention provides a multilayer capacitor comprising a multilayer body in which a plurality of dielectric layers and a plurality of inner electrodes are alternately laminated, and a plurality of terminal electrodes formed on the multilayer body; the multilayer capacitor having a capacitor portion including a first number of first inner electrodes and a second number of second inner electrodes alternately arranged as the plurality of inner electrodes; wherein the plurality of terminal electrodes include first and second terminal electrodes electrically insulated from each other; wherein the first number of first inner electrodes are electrically connected to each other by way of a through-hole conductor; wherein the second number of second inner electrodes are electrically connected to each other by way of a through-hole conductor; wherein, in the first number of first inner electrodes, at least one first inner electrode whose number is smaller than the first number by at least 1 is electrically connected to the first terminal electrode by way of a lead conductor; wherein, in the second number of second inner electrodes, at least one second inner electrode whose number is smaller than the second number by at least 1 is electrically connected to the second terminal electrode by way of a lead conductor; and wherein an equivalent series resistance is set to a desirable value by adjusting each of a position of the first inner electrode electrically connected to the first terminal electrode by way of the lead conductor in the laminating direction of the multilayer body and a position of the second inner electrode electrically connected to the second terminal electrode by way of the lead conductor in the laminating direction of the multilayer body.

In still another aspect, the present invention provides a method of adjusting an equivalent series resistance of a multilayer capacitor comprising a multilayer body in which a plurality of dielectric layers and a plurality of inner electrodes are alternately laminated, and a plurality of terminal electrodes formed on the multilayer body; the multilayer capacitor having a capacitor portion including a first number of first inner electrodes and a second number of second inner electrodes alternately arranged as the plurality of inner electrodes; wherein the plurality of terminal electrodes include first and second terminal electrodes electrically insulated from each other; the method comprising the steps of electrically connecting the first number of first inner electrodes to each other by way of a through-hole conductor; electrically connecting the second number of second inner electrodes to each other by way of a through-hole conductor; electrically connecting, in the first number of first inner electrodes, at least one first inner electrode whose number is smaller than the first number by at least 1 to the first terminal electrode by way of a lead conductor; electrically connecting, in the second number of second inner electrodes, at least one second inner electrode whose number is smaller than the second number by at least 1 to the second terminal electrode by way of a lead conductor; and setting the equivalent series resistance to a desirable value by adjusting each of a position of the first inner electrode electrically connected to the first terminal electrode by way of the lead conductor in the laminating direction of the multilayer body and a position of the second inner electrode electrically connected to the second terminal electrode by way of the lead conductor in the laminating direction of the multilayer body.

By adjusting each of a position of the first inner electrode electrically connected to the first terminal electrode by way of the lead conductor in the laminating direction of the multilayer body and a position of the second inner electrode electrically connected to the second terminal electrode by way of the lead conductor in the laminating direction of the multilayer body, each of the multilayer capacitor and method of adjusting an equivalent series resistance of a multilayer capacitor in accordance with these aspects of the present invention sets the equivalent series resistance to a desirable value and thus can regulate the equivalent series resistance easily with a high precision.

Preferably, each of the number of through-hole conductors electrically connecting the first number of first inner electrodes to each other and the number of through-hole conductors electrically connecting the second number of second inner electrodes to each other is further adjusted, so as to set the equivalent series resistance to the desirable value. In this case, the equivalent series resistance can be regulated with a higher precision.

Preferably, the first number of first inner electrodes are connected in parallel, and the second number of second electrodes are connected in parallel. In this case, even when the ohmic value fluctuates among the first or second inner electrodes, its influence on the equivalent series resistance of the multilayer capacitor as a whole is small, whereby the equivalent series resistance regulation can be restrained from lowering its precision.

The present invention can provide a multilayer capacitor and a method of adjusting an equivalent series resistance of a multilayer capacitor, which can regulate the equivalent series resistance easily with a high precision.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 27 is an exploded perspective view of a modified example of the multilayer body included in the multilayer capacitor in accordance with the first embodiment.

DESCRIPTION OF THE PREFERRED EMBODIMENTS

In the following, preferred embodiments of the present invention will be explained in detail with reference to the accompanying drawings. In the explanation, constituents identical to each other or those having functions identical to each other will be referred to with numerals identical to each other without repeating their overlapping descriptions. Words "uppermost" and "downward" used in the explanation conform to the vertical direction in each drawing. The multilayer capacitor in accordance with each embodiment is described so as to include a method of adjusting an equivalent series resistance of a multilayer capacitor in accordance with the present invention.

First Embodiment

Figure 1:
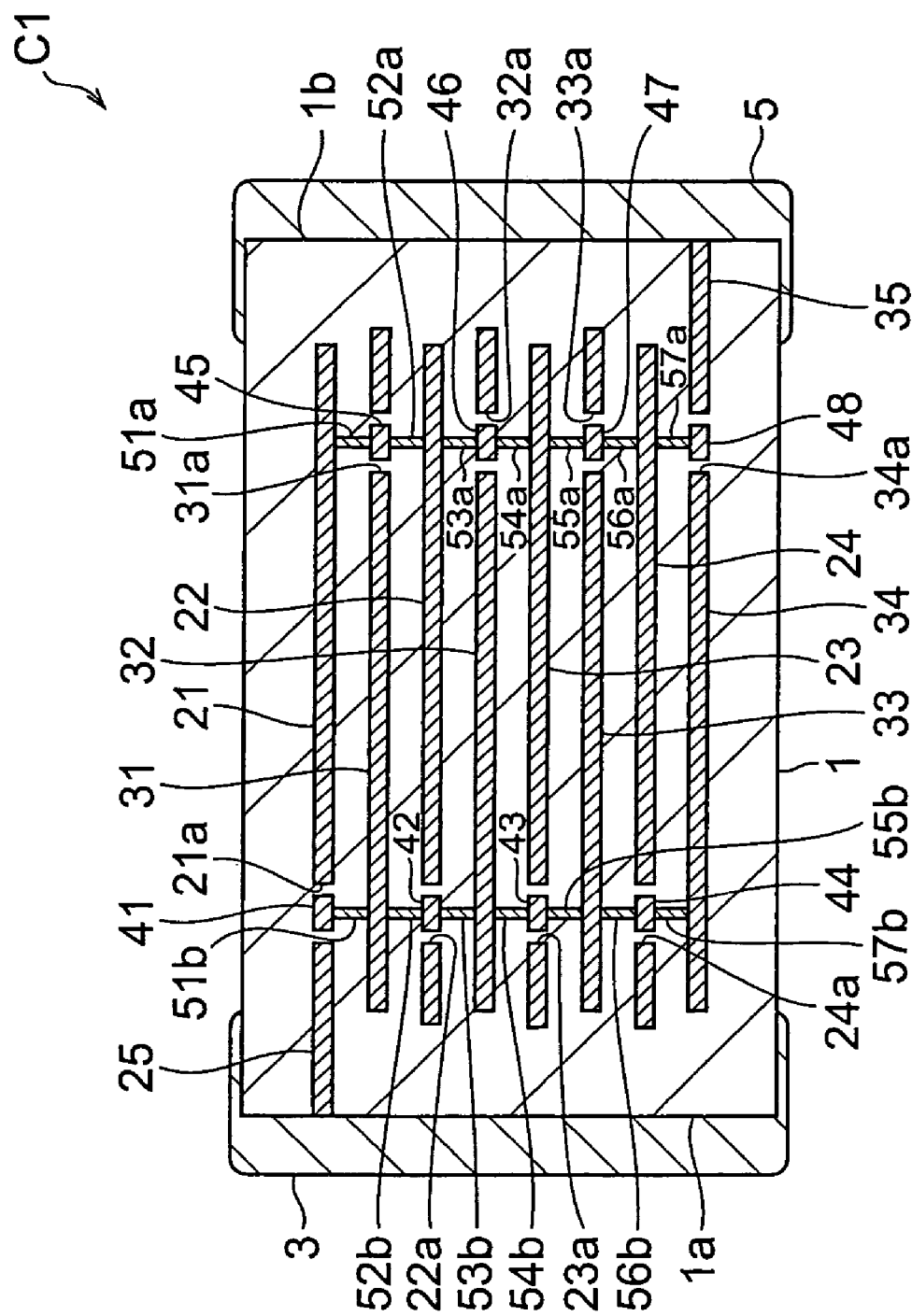
FIG. 1 is a view for explaining a cross-sectional configuration of the multilayer capacitor in accordance with a first embodiment.
Figure 2:
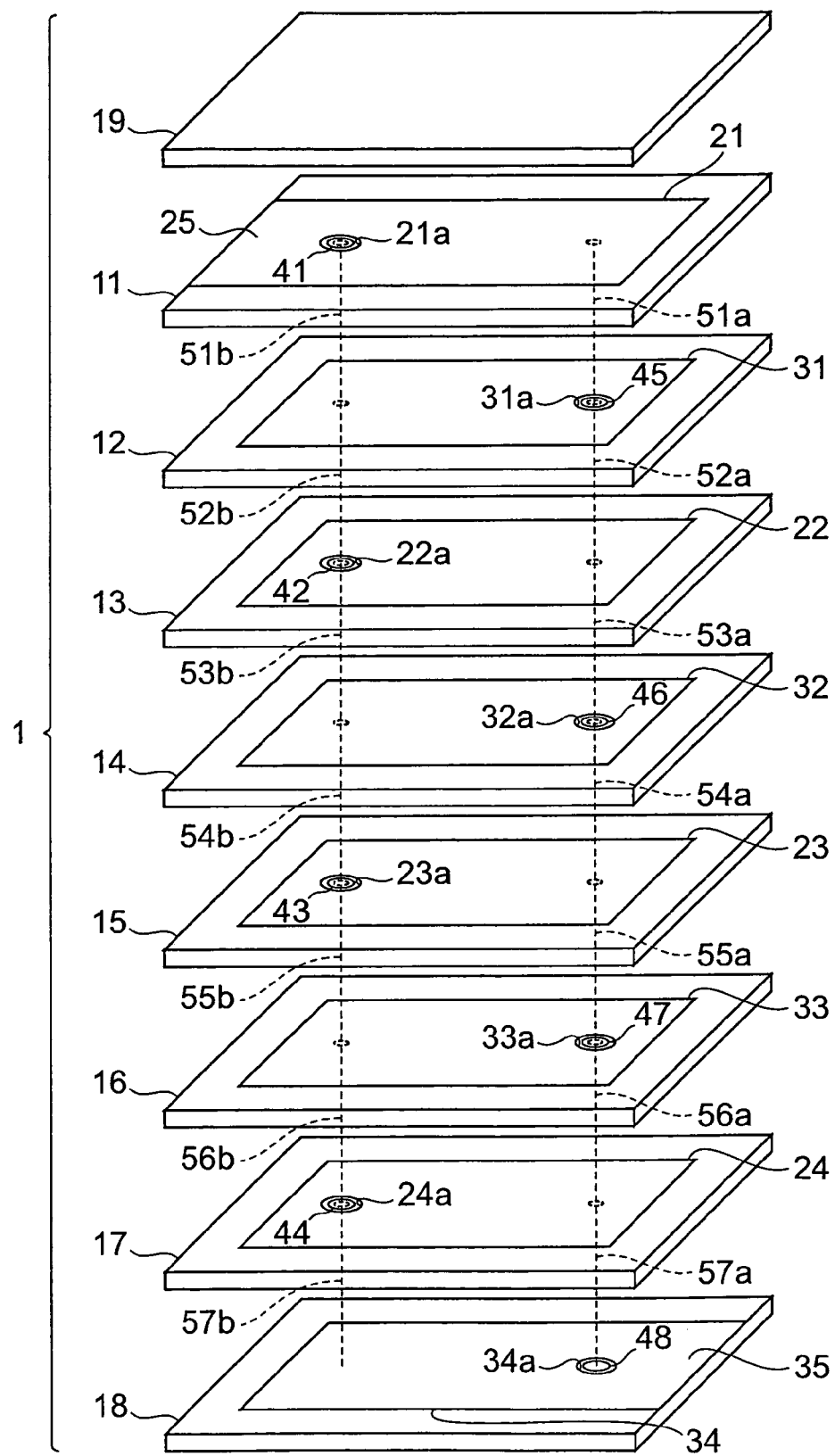
FIG. 2 is an exploded perspective view of the multilayer body included in the multilayer capacitor in accordance with the first embodiment.

With reference to FIGS. 1 and 2, the structure of the multilayer capacitor C1 in accordance with a first embodiment will be explained. FIG. 1 is a view for explaining a cross-sectional configuration of the multilayer capacitor in accordance with the first embodiment. FIG. 2 is an exploded perspective view of the multilayer body included in the multilayer capacitor in accordance with the first embodiment.

As shown in FIG. 1, the multilayer capacitor C1 comprises a multilayer body 1 and first and second terminal electrodes 3, 5 which are formed on the multilayer body 1.

The first terminal electrode 3 is positioned on the side of a side face 1a of the multilayer body 1. The second electrode 5 is positioned on the side of a side face 1b of the multilayer body 1. The first terminal electrode 3 and the second terminal electrode 5 are electrically insulated from each other.

As also shown in FIG. 2, the multilayer body 1 is constructed by alternately laminating a plurality of (9 in this embodiment) dielectric layers 11 to 19 and a plurality of (4 each in this embodiment) first and second internal electrodes 21 to 24, 31 to 34. In the actual multilayer capacitor C1, they are integrated to such an extent that no boundaries are discernible between the dielectric layers 11 to 19.

Each of the first inner electrodes 21 to 24 has a rectangular form. The first inner electrodes 21 to 24 are formed at respective positions separated by a predetermined gap from a side face parallel to the laminating direction of the dielectric layers 11 to 19 (hereinafter simply referred to as "laminating direction") in the multilayer body 1. The first inner electrodes 21 to 24 are formed with openings 21a to 24a so as to expose the dielectric layers 11, 13, 15, 17. On the dielectric layers 11, 13, 15, 17, land-like inner conductors 41 to 44 are positioned at areas corresponding to the openings 21a to 24a formed in the first inner electrodes 21 to 24, respectively.

Each of the second inner electrodes 31 to 34 has a rectangular form. The second inner electrodes 31 to 34 are formed at respective positions separated by a predetermined gap from a side face parallel to the laminating direction in the multilayer body 1. The second inner electrodes 31 to 34 are formed with openings 31a to 34a so as to expose the dielectric layers 12, 14, 16, 18. On the dielectric layers 12, 14, 16, 18, land-like inner conductors 45 to 48 are positioned at areas corresponding to the openings 31a to 34a formed in the second inner electrodes 31 to 34, respectively.

Formed at respective positions corresponding to the inner conductors 45 and 41 in the dielectric layer 11 are through-hole conductors 51a, 51b penetrating through the dielectric layer 11 in its thickness direction. The through-hole conductor 51a is electrically connected to the first inner electrode 21. The through-hole conductor 51b is electrically connected to the inner conductor 41. While in a state where the dielectric layers 11, 12 are laminated, the through-hole conductor 51a is electrically connected to the inner conductor 45. While in a state where the dielectric layers 11, 12 are laminated, the through-hole conductor 51b is electrically connected to the second inner electrode 31.

Formed at respective positions corresponding to the inner conductors 45 and 42 in the dielectric layer 12 are through-hole conductors 52a, 52b penetrating through the dielectric layer 12 in its thickness direction. The through-hole conductor 52a is electrically connected to the inner conductor 45. The through-hole conductor 52b is electrically connected to the second inner electrode 31. While in a state where the dielectric layers 12, 13 are laminated, the through-hole conductor 52a is electrically connected to the first inner electrode 22. While in a state where the dielectric layers 12, 13 are laminated, the through-hole conductor 52b is electrically connected to the inner conductor 42.

Formed at respective positions corresponding to the inner conductors 46 and 42 in the dielectric layer 13 are through-hole conductors 53a, 53b penetrating through the dielectric layer 13 in its thickness direction. The through-hole conductor 53a is electrically connected to the first inner electrode 22. The through-hole conductor 53b is electrically connected to the inner conductor 42. While in a state where the dielectric layers 13, 14 are laminated, the through-hole conductor 53a is electrically connected to the inner conductor 46. While in a state where the dielectric layers 13, 14 are laminated, the through-hole conductor 53b is electrically connected to the second inner electrode 32.

Formed at respective positions corresponding to the inner conductors 46 and 43 in the dielectric layer 14 are through-hole conductors 54a, 54b penetrating through the dielectric layer 14 in its thickness direction. The through-hole conductor 54a is electrically connected to the inner conductor 46. The through-hole conductor 54b is electrically connected to the second inner electrode 32. While in a state where the dielectric layers 14, 15 are laminated, the through-hole conductor 54a is electrically connected to the first inner electrode 23. While in a state where the dielectric layers 14, 15 are laminated, the through-hole conductor 54b is electrically connected to the inner conductor 43.

Formed at respective positions corresponding to the inner conductors 47 and 43 in the dielectric layer 15 are through-hole conductors 55a, 55b penetrating through the dielectric layer 15 in its thickness direction. The through-hole conductor 55a is electrically connected to the first inner electrode 23. The through-hole conductor 55b is electrically connected to the inner conductor 43. While in a state where the dielectric layers 15, 16 are laminated, the through-hole conductor 55a is electrically connected to the inner conductor 47. While in a state where the dielectric layers 15, 16 are laminated, the through-hole conductor 55b is electrically connected to the second inner electrode 33.

Formed at respective positions corresponding to the inner conductors 47 and 44 in the dielectric layer 16 are through-hole conductors 56a, 56b penetrating through the dielectric layer 16 in its thickness direction. The through-hole conductor 56a is electrically connected to the inner conductor 47. The through-hole conductor 56b is electrically connected to the second inner electrode 33. While in a state where the dielectric layers 16, 17 are laminated, the through-hole conductor 56a is electrically connected to the first inner electrode 24. While in a state where the dielectric layers 16, 17 are laminated, the through-hole conductor 56b is electrically connected to the inner conductor 44.

Formed at respective positions corresponding to the inner conductors 48 and 44 in the dielectric layer 17 are through-hole conductors 57a, 57b penetrating through the dielectric layer 17 in its thickness direction. The through-hole conductor 57a is electrically connected to the first inner electrode 24. The through-hole conductor 57b is electrically connected to the inner conductor 44. While in a state where the dielectric layers 17, 18 are laminated, the through-hole conductor 57a is electrically connected to the inner conductor 48. While in a state where the dielectric layers 17, 18 are laminated, the through-hole conductor 57b is electrically connected to the second inner electrode 34.

When the dielectric layers 11 to 17 are laminated, the through-hole conductors 51a to 57a are arranged substantially linearly in the laminating direction, and are electrically connected to each other, so as to construct a conductive path. The first inner electrodes 21 to 24 are electrically connected to each other by way of the through-hole conductors 51a to 57a and inner conductors 45 to 48.

The first inner electrode 21 is electrically connected to the first terminal electrode 3 by way of a lead conductor 25. Consequently, the first inner electrodes 22 to 24 are electrically connected to the first terminal electrode 3, whereby the first inner electrodes 21 to 24 are connected in parallel. The lead conductor 25 is formed integrally with the first inner electrode 21 and extends therefrom so as to reach the side face 1a of the multilayer body 1.

When the dielectric layers 11 to 17 are laminated, the through-hole conductors 51b to 57b are arranged substantially linearly in the laminating direction as with the through-hole conductors 51a to 57a and are electrically connected to each other, so as to construct a conductive path. The second inner electrodes 31 to 34 are electrically connected to each other by way of the through-hole conductors 51b to 57b and inner conductors 41 to 44.

The second inner electrode 34 is electrically connected to the second terminal electrode 5 by way of a lead conductor 35. Consequently, the second inner electrodes 31 to 33 are electrically connected to the second terminal electrode 5, whereby the second inner electrodes 31 to 34 are connected in parallel. The lead conductor 35 is formed integrally with the second inner electrode 34 and extends therefrom so as to reach the side face 1b of the multilayer body 1.

In the multilayer capacitor C1, the number of first inner electrode 21 directly connected to the first terminal electrode 3 by way of the lead conductor 25 is 1, which is smaller than the total number (4 in this embodiment) of the first inner electrodes 21 to 24. In the multilayer capacitor C1, the number of second inner electrode 34 directly connected to the second terminal electrode 5 by way of the lead conductor 35 is 1, which is smaller than the total number (4 in this embodiment) of the second inner electrodes 31 to 34. In the multilayer capacitor C1, the through-hole conductors 51a to 57a are connected to the first terminal electrode 3 in series and thus attain a relatively large combined resistance component. In the multilayer capacitor C1, the through-hole conductors 51b to 57b are connected to the second terminal electrode 5 in series and thus attain a relatively large combined resistance component. These allow the multilayer capacitor C1 to yield an equivalent series resistance greater than that of a conventional multilayer capacitor in which all the inner electrodes are connected to their corresponding terminal electrodes by way of lead conductors.

As in the foregoing, by adjusting the number of first inner electrode 21 electrically connected to the first terminal electrode 3 by way of the lead conductor 25 and the number of second inner electrode 34 electrically connected to the second terminal electrode 5 by way of the lead conductor 35, this embodiment sets the equivalent series resistance of the multilayer capacitor C1 to a desirable value and thus can regulate the equivalent series resistance easily with a high precision.

In this embodiment, the first inner electrodes 21 to 24 are connected in parallel, and the second inner electrodes 31 to 34 are connected in parallel. As a consequence, even when the ohmic value fluctuates among the first inner electrodes 21 to 24 or among the second inner electrodes 31 to 34, its influence on the equivalent series resistance in the multilayer capacitor C1 as a whole is small, whereby the equivalent series resistance regulation can be restrained from lowering its precision.

Second Embodiment

Figure 3:
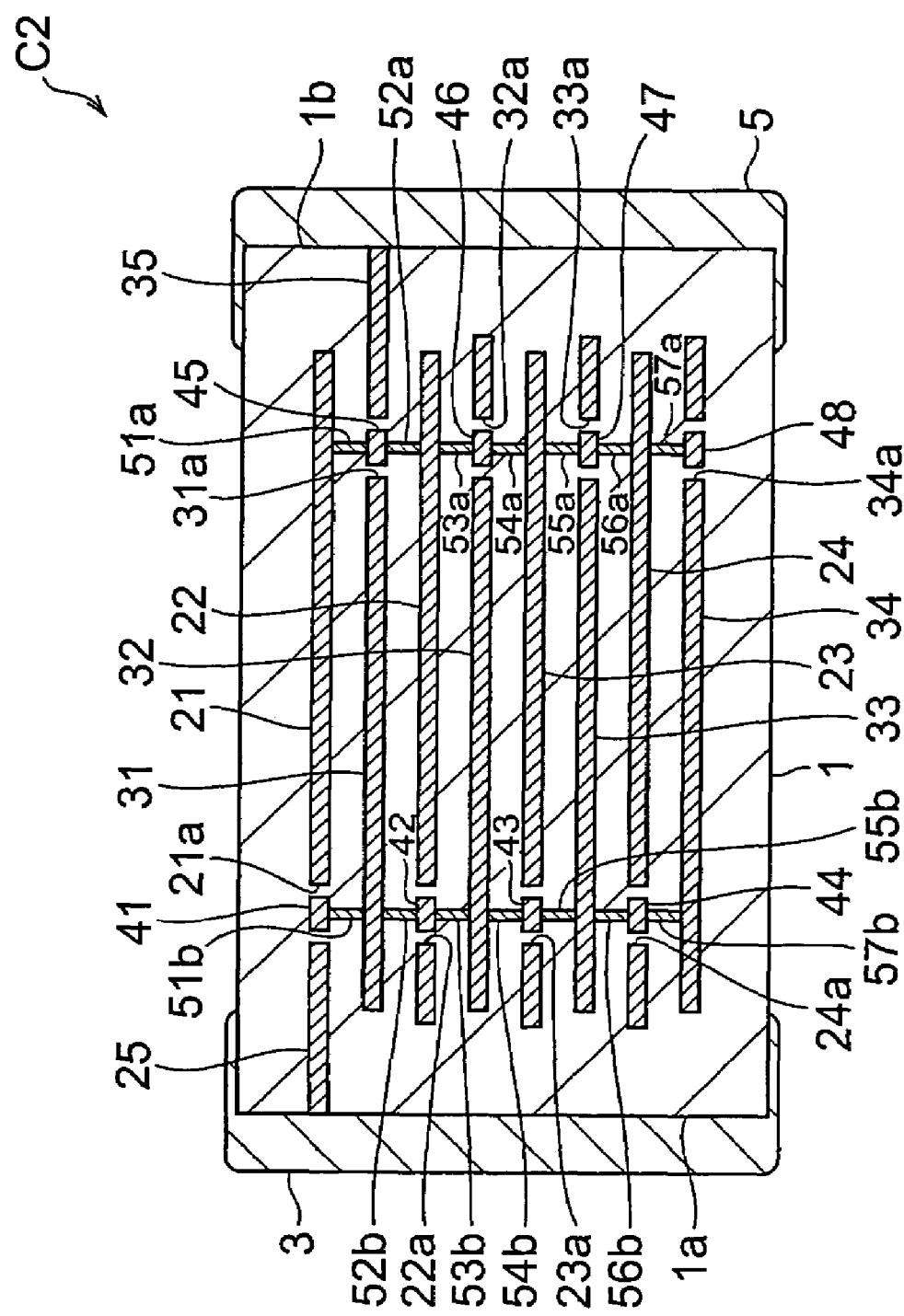
FIG. 3 is a view for explaining a cross-sectional configuration of the multilayer capacitor in accordance with a second embodiment.
Figure 4:
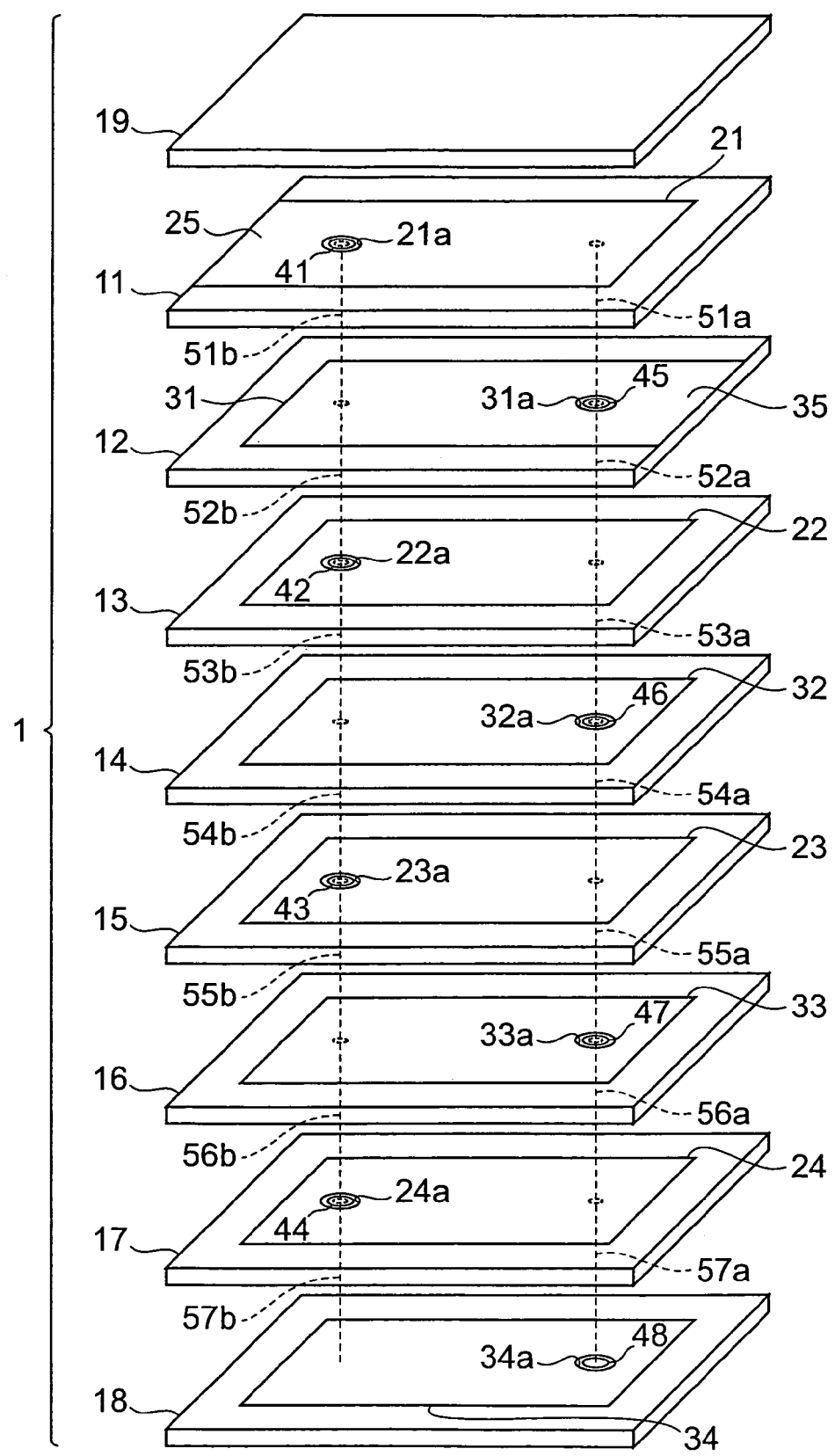
FIG. 4 is an exploded perspective view of the multilayer body included in the multilayer capacitor in accordance with the second embodiment.

The structure of the multilayer capacitor C2 in accordance with a second embodiment will be explained with reference to FIGS. 3 and 4. The multilayer capacitor C2 in accordance with the second embodiment differs from the multilayer capacitor C1 in accordance with the first embodiment in terms of the position of the second inner electrode 31 connected to the second terminal electrode 5 by way of the lead conductor 35 in the laminating direction. FIG. 3 is a view for explaining a cross-sectional configuration of the multilayer capacitor in accordance with the second embodiment. FIG. 4 is an exploded perspective view of the multilayer body included in the multilayer capacitor in accordance with the second embodiment.

Among the four second inner electrodes 31 to 34 in the multilayer capacitor C2, the uppermost one 31 is electrically connected to the second terminal electrode 5 by way of the lead conductor 35 as shown in FIGS. 3 and 4. This electrically connects the second inner electrodes 32 to 34 to the second terminal electrode 5 as well, whereby the second inner electrodes 31 to 34 are connected in parallel. The lead conductor 35 is formed integrally with the second inner electrode 31 and extends therefrom so as to reach a side face 1b of the multilayer body 1.

In the multilayer capacitor C2, the number of first inner electrode 21 directly connected to the first terminal electrode 3 by way of the lead conductor 25 is 1, which is smaller than the total number (4 in this embodiment) of the first inner electrodes 21 to 24. In the multilayer capacitor C2, the number of second inner electrode 31 directly connected to the second terminal electrode 5 by way of the lead conductor 35 is 1, which is smaller than the total number (4 in this embodiment) of the second inner electrodes 31 to 34. These allow the multilayer capacitor C2 to yield an equivalent series resistance greater than that of a conventional multilayer capacitor in which all the inner electrodes are connected to their corresponding terminal electrodes by way of lead conductors.

Meanwhile, at the inner electrode 31 as a boundary, the resistance component of the through-hole conductors 51b to 57b is divided into the resistance component of the through-hole conductor 51b positioned on one side of the second inner electrode 31 in the laminating direction and the combined resistance component of the through-hole conductors 52b to 57b positioned on the other side of the second inner electrode 31 in the laminating direction. The resistance component of the through-hole conductor 51b and the combined resistance component of the through-hole conductors 52b to 57b are connected in parallel to the second terminal electrode 5. Consequently, the multilayer capacitor C2 in accordance with the second embodiment yields an equivalent series resistance smaller than that of the multilayer capacitor C1 in accordance with the first embodiment in which two sets of the through-hole conductors 51a to 57a and 51b to 57b are each connected in series.

As in the foregoing, by adjusting the position of the first inner electrode 23 electrically connected to the first terminal electrode 3 by way of the lead conductor 25 in the laminating direction and the position of the second inner electrode 31 electrically connected to the second terminal electrode 5 by way of the lead conductor 35, this embodiment sets the equivalent series resistance of the multilayer capacitor C2 to a desirable value and thus can easily regulate the equivalent series resistance with a high precision.

Third Embodiment

Figure 5:
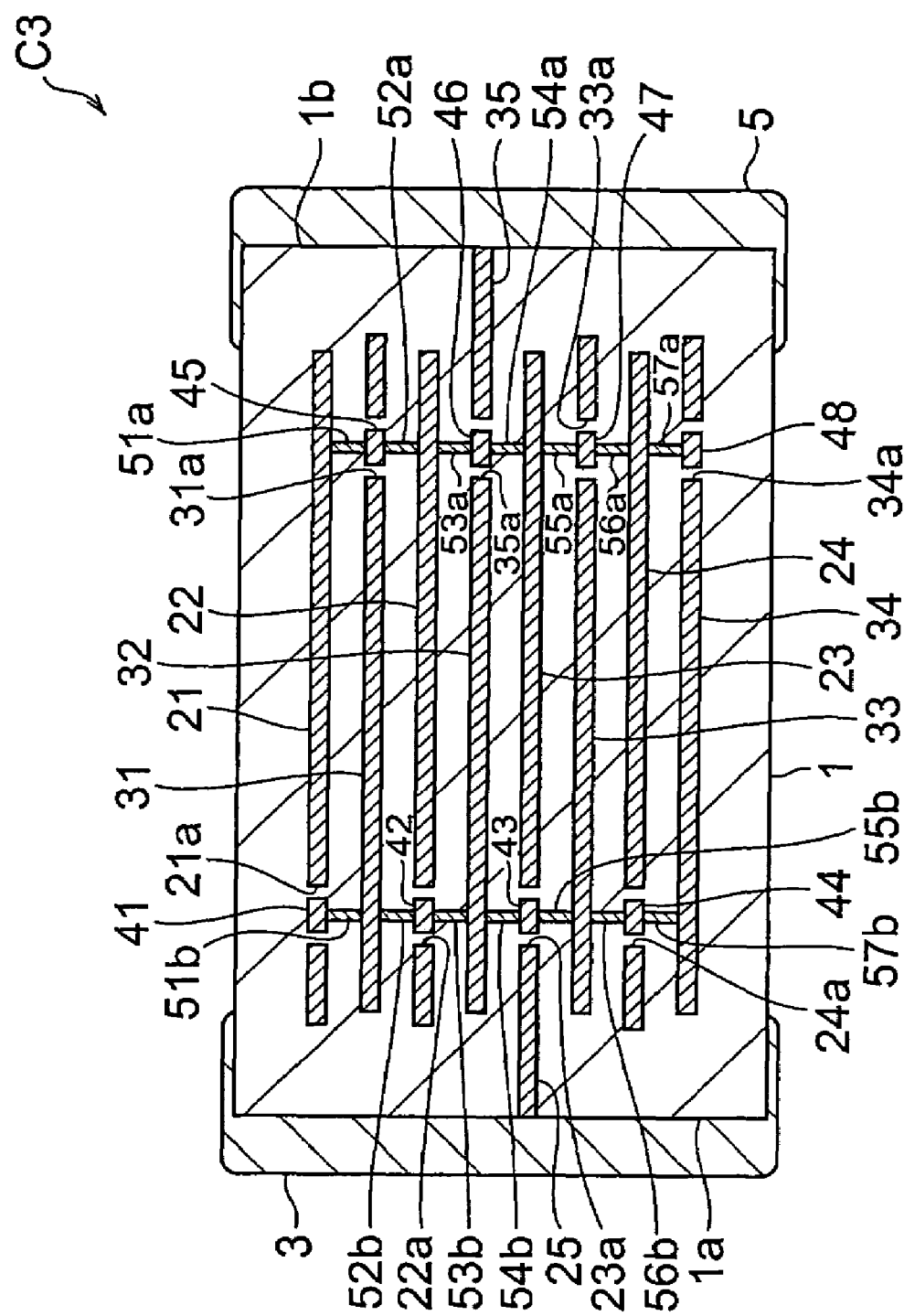
FIG. 5 is a view for explaining a cross-sectional configuration of the multilayer capacitor in accordance with a third embodiment.
Figure 6:
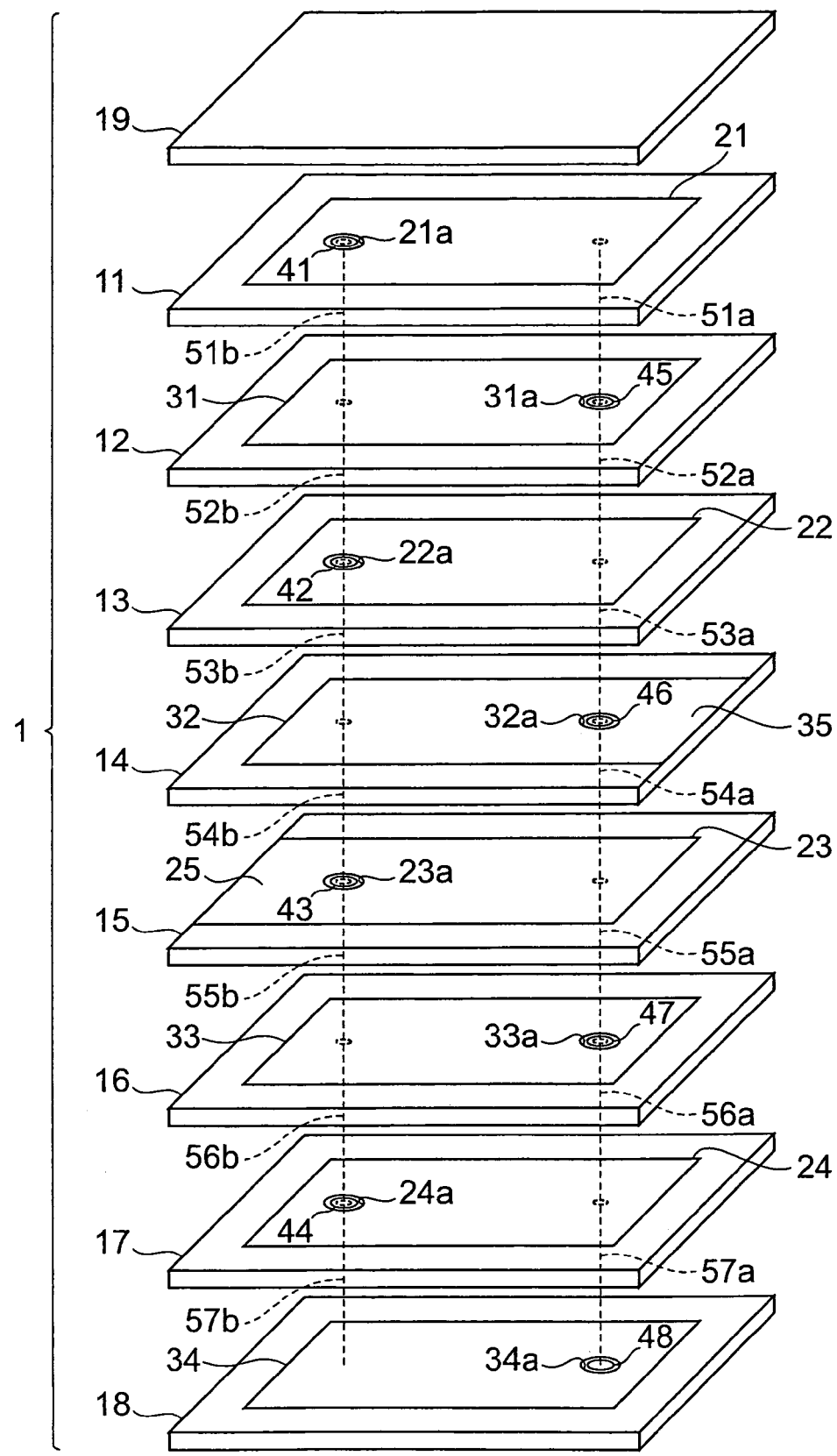
FIG. 6 is an exploded perspective view of the multilayer body included in the multilayer capacitor in accordance with the third embodiment.

With reference to FIGS. 5 and 6, the structure of the multilayer capacitor C3 in accordance with a third embodiment will be explained. The multilayer capacitor C3 in accordance with the third embodiment differs from the multilayer capacitor C1 in accordance with the first embodiment in terms of positions of the first and second inner electrodes 23, 32 connected to the terminal electrodes 3, 5 by way of the lead conductors 25, 35 in the laminating direction. FIG. 5 is a view for explaining a cross-sectional configuration of the multilayer capacitor in accordance with the third embodiment. FIG. 6 is an exploded perspective view of the multilayer body included in the multilayer capacitor in accordance with the third embodiment.

Among the four first inner electrodes 21 to 24 in the multilayer capacitor C3, the third one 23 counted downward from the first inner electrode 21 is electrically connected to the first terminal electrode 3 by way of the lead conductor 25 as shown in FIGS. 5 and 6. This electrically connects the first inner electrodes 21, 22, 24 to the first terminal electrode 3 as well, whereby the first inner electrodes 21 to 24 are connected in parallel. The lead conductor 25 is formed integrally with the first inner electrode 23 and extends therefrom so as to reach a side face 1a of the multilayer body 1.

Among the four second inner electrodes 31 to 34, the second one 32 counted downward from the second inner electrode 31 is electrically connected to the second terminal electrode 5 by way of the lead conductor 35. This electrically connects the second electrodes 31, 33, 34 to the second terminal electrode 5 as well, whereby the second inner electrodes 31 to 34 are connected in parallel. The lead conductor 35 is formed integrally with the second inner electrode 32 and extends therefrom so as to reach a side face 1b of the multilayer body 1.

In the multilayer capacitor C3, the number of first inner electrode 23 directly connected to the first terminal electrode 3 by way of the lead conductor 25 is 1, which is smaller than the total number (4 in this embodiment) of the first inner electrodes 21 to 24. In the multilayer capacitor C3, the number of second inner electrode 32 directly connected to the second terminal electrode 5 by way of the lead conductor 35 is 1, which is smaller than the total number (4 in this embodiment) of the second inner electrodes 31 to 34. These allow the multilayer capacitor C3 to yield an equivalent series resistance greater than that of a conventional multilayer capacitor in which all the inner electrodes are connected to their corresponding terminal electrodes by way of lead conductors.

Meanwhile, at the first inner electrode 23 as a boundary, the resistance component of the through-hole conductors 51a to 57a is divided into the combined resistance component of the through-hole conductors 51a to 54a positioned on one side of the first inner electrode 23 in the laminating direction and the combined resistance component of the through-hole conductors 55a to 57a positioned on the other side of the first inner electrode 23 in the laminating direction. The combined resistance component of the through-hole conductors 51a to 54a and the combined resistance component of the through-hole conductors 55a to 57a are connected in parallel to the first terminal electrode 3. At the second inner electrode 32 as a boundary, the resistance component of the through-hole conductors 51b to 57b is divided into the combined resistance component of the through-hole conductors 51b to 53b positioned on one side of the second inner electrode 32 in the laminating direction and the combined resistance component of the through-hole conductors 54b to 57b positioned on the other side of the second inner electrode 32 in the laminating direction. The combined resistance component of the through-hole conductors 51b to 53b and the combined resistance component of the through-hole conductors 54b to 57b are connected in parallel to the second terminal electrode 5. Consequently, the multilayer capacitor C3 in accordance with the third embodiment yields an equivalent series resistance smaller than that of the multilayer capacitor C1 in accordance with the first embodiment in which two sets of the through-hole conductors 51a to 57a and 51b to 57b are each connected in series.

As in the foregoing, by adjusting the position of the first inner electrode 23 electrically connected to the first terminal electrode 3 by way of the lead conductor 25 in the laminating direction and the position of the second inner electrode 32 electrically connected to the second terminal electrode 5 by way of the lead conductor 35, this embodiment sets the equivalent series resistance of the multilayer capacitor C3 to a desirable value and thus can easily regulate the equivalent series resistance with a high precision.

Fourth Embodiment

Figure 7:
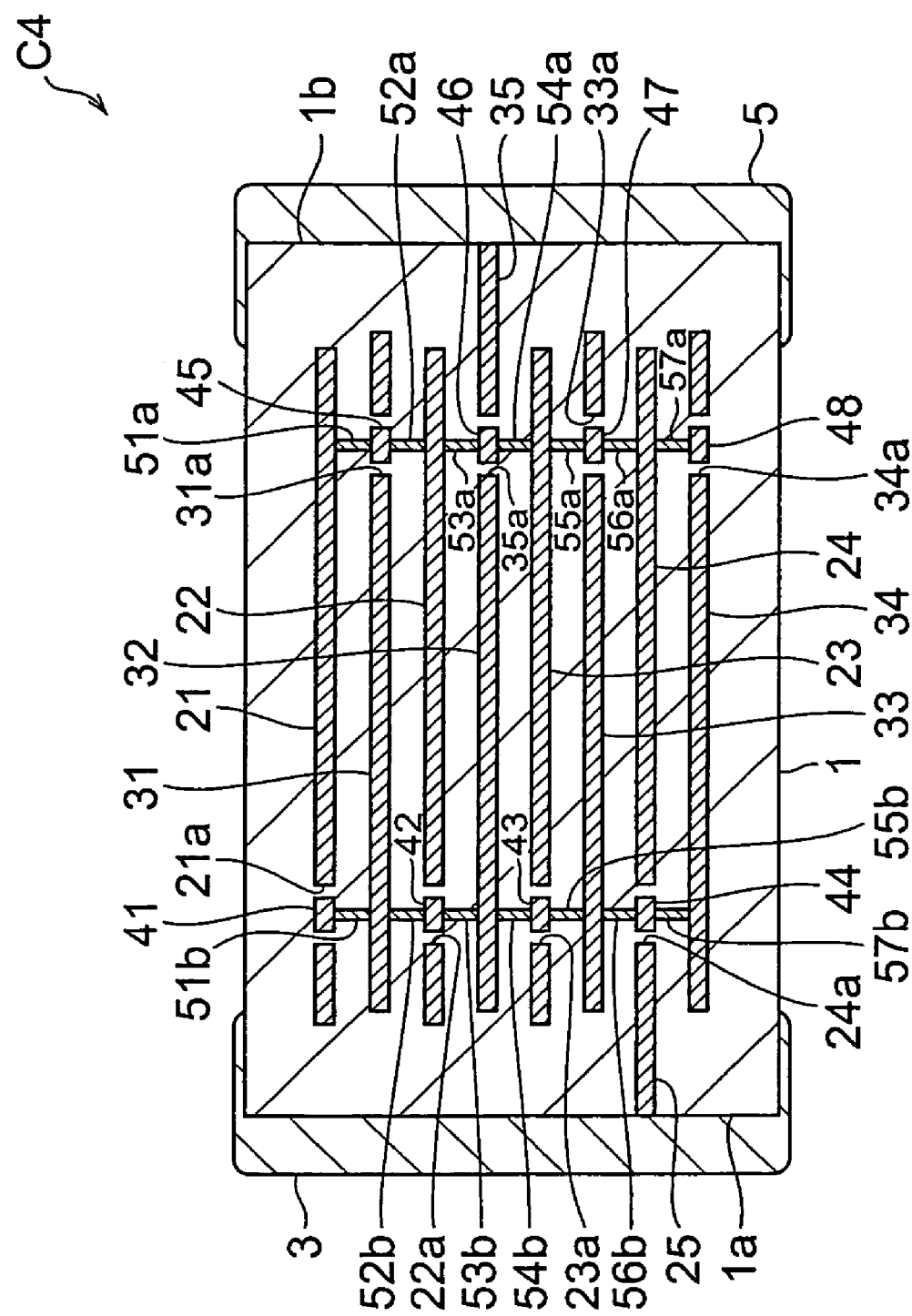
FIG. 7 is a view for explaining a cross-sectional configuration of the multilayer capacitor in accordance with a fourth embodiment.
Figure 8:
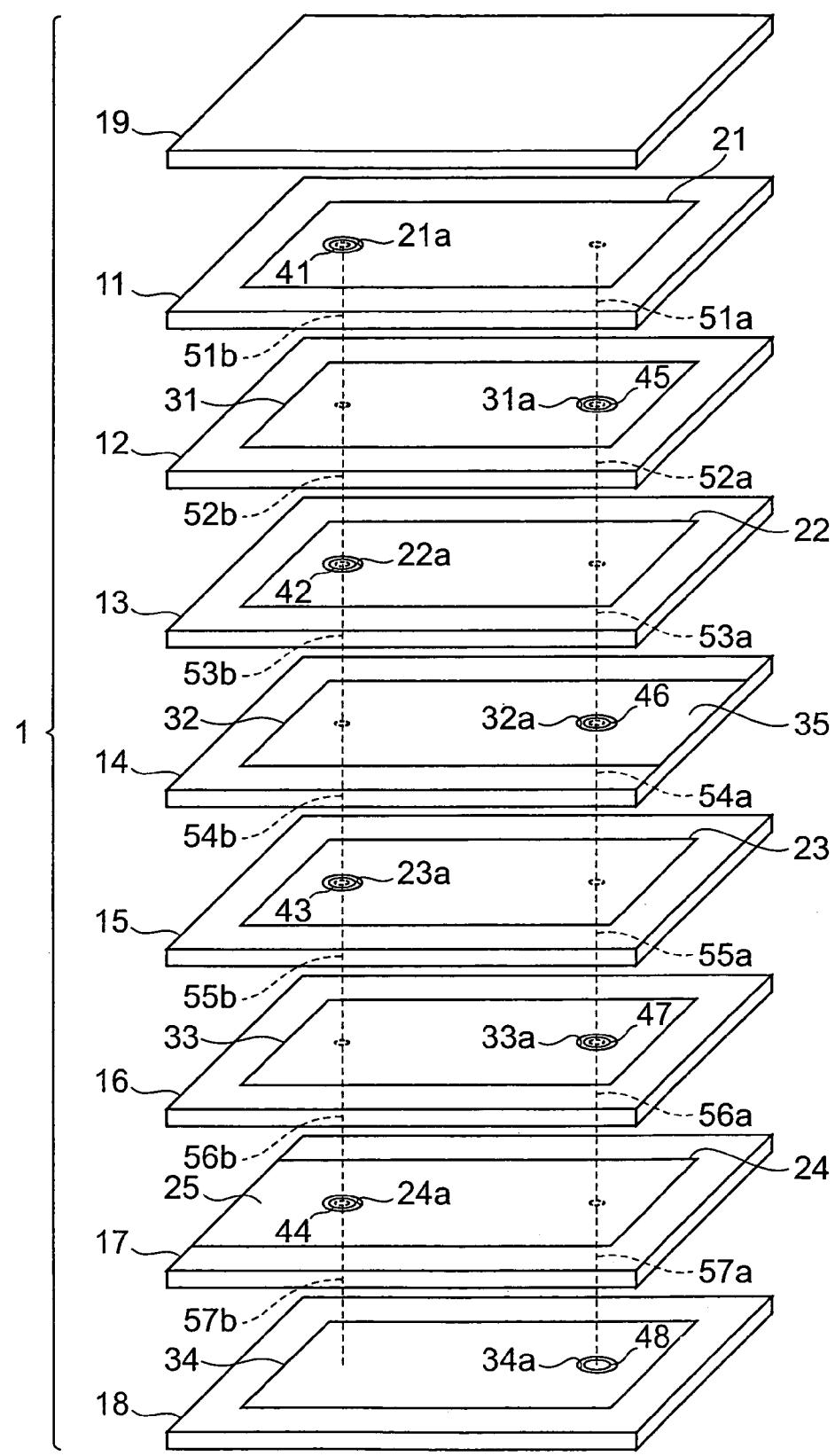
FIG. 8 is an exploded perspective view of the multilayer body included in the multilayer capacitor in accordance with the fourth embodiment.

With reference to FIGS. 7 and 8, the structure of the multilayer capacitor C4 in accordance with a fourth embodiment will be explained. The multilayer capacitor C4 in accordance with the fourth embodiment differs from the multilayer capacitor C1 in accordance with the first embodiment in terms of positions of the first and second inner electrodes 24, 32 connected to the terminal electrodes 3, 5 by way of the lead conductors 25, 35 in the laminating direction. FIG. 7 is a view for explaining a cross-sectional configuration of the multilayer capacitor in accordance with the fourth embodiment. FIG. 8 is an exploded perspective view of the multilayer body included in the multilayer capacitor in accordance with the fourth embodiment.

Among the four first inner electrodes 21 to 24 in the multilayer capacitor C4, the fourth one 24 counted downward from the first inner electrode 21 is electrically connected to the first terminal electrode 3 by way of the lead conductor 25 as shown in FIGS. 7 and 8. This electrically connects the first inner electrodes 21 to 23 to the first terminal electrode 3 as well, whereby the first inner electrodes 21 to 24 are connected in parallel. The lead conductor 25 is formed integrally with the first inner electrode 24 and extends therefrom so as to reach a side face 1a of the multilayer body 1.

Among the four second inner electrodes 31 to 34, the second one 32 counted downward from the second inner electrode 31 is electrically connected to the second terminal electrode 5 by way of the lead conductor 35. This electrically connects the first second electrodes 31, 33, 34 to the second terminal electrode 5 as well, whereby the second inner electrodes 31 to 34 are connected in parallel. The lead conductor 35 is formed integrally with the second inner electrode 32 and extends therefrom so as to reach a side face 1b of the multilayer body 1.

In the multilayer capacitor C4, the number of first inner electrode 24 directly connected to the first terminal electrode 3 by way of the lead conductor 25 is 1, which is smaller than the total number (4 in this embodiment) of the first inner electrodes 21 to 24. In the multilayer capacitor C4, the number of second inner electrode 32 directly connected to the second terminal electrode 5 by way of the lead conductor 35 is 1, which is smaller than the total number (4 in this embodiment) of the second inner electrodes 31 to 34. These allow the multilayer capacitor C4 to yield an equivalent series resistance greater than that of a conventional multilayer capacitor in which all the inner electrodes are connected to their corresponding terminal electrodes by way of lead conductors.

Meanwhile, at the first inner electrode 24 as a boundary, the resistance component of the through-hole conductors 51a to 57a is divided into the combined resistance component of the through-hole conductors 51a to 56a positioned on one side of the first inner electrode 24 in the laminating direction and the resistance component of the through-hole conductor 57a positioned on the other side of the first inner electrode 24 in the laminating direction. The combined resistance component of the through-hole conductors 51a to 56a and the resistance component of the through-hole conductor 57a are connected in parallel to the first terminal electrode 3. At the second inner electrode 32 as a boundary, the resistance component of the through-hole conductors 51b to 57b is divided into the combined resistance component of the through-hole conductors 51b to 53b positioned on one side of the second inner electrode 32 in the laminating direction and the combined resistance component of the through-hole conductors 54b to 57b positioned on the other side of the second inner electrode 32 in the laminating direction. The combined resistance component of the through-hole conductors 51b to 53b and the combined resistance component of the through-hole conductors 54b to 57b are connected in parallel to the second terminal electrode 5. Consequently, the multilayer capacitor C4 in accordance with the fourth embodiment yields an equivalent series resistance smaller than that of the multilayer capacitor C1 in accordance with the first embodiment in which two sets of the through-hole conductors 51a to 57a and 51b to 57b are each connected in series.

As in the foregoing, by adjusting the position of the first inner electrode 24 electrically connected to the first terminal electrode 3 by way of the lead conductor 25 in the laminating direction and the position of the second inner electrode 32 electrically connected to the second terminal electrode 5 by way of the lead conductor 35, this embodiment sets the equivalent series resistance of the multilayer capacitor C4 to a desirable value and thus can easily regulate the equivalent series resistance with a high precision.

Fifth Embodiment

Figure 9:
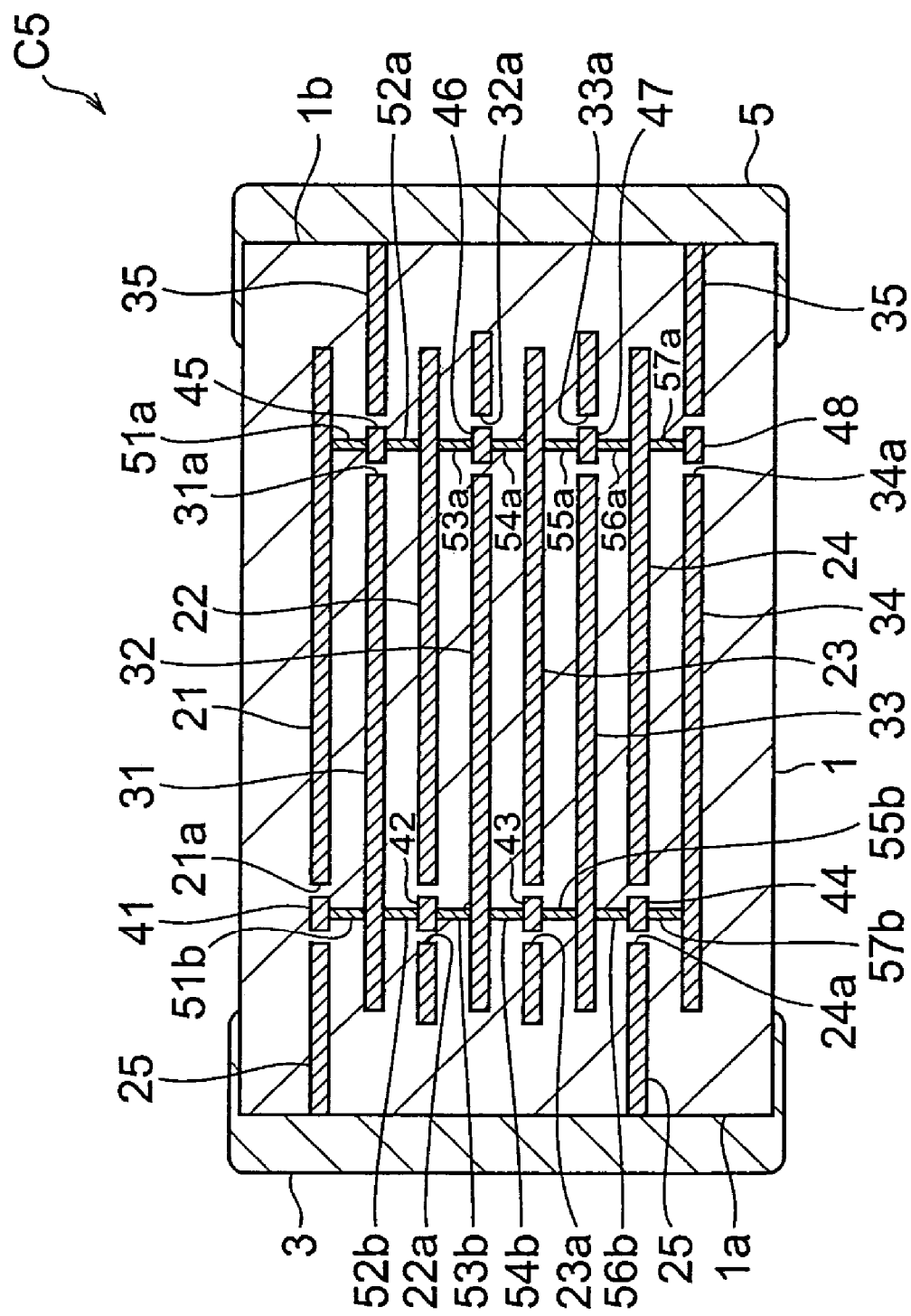
FIG. 9 is a view for explaining a cross-sectional configuration of the multilayer capacitor in accordance with a fifth embodiment.
Figure 10:
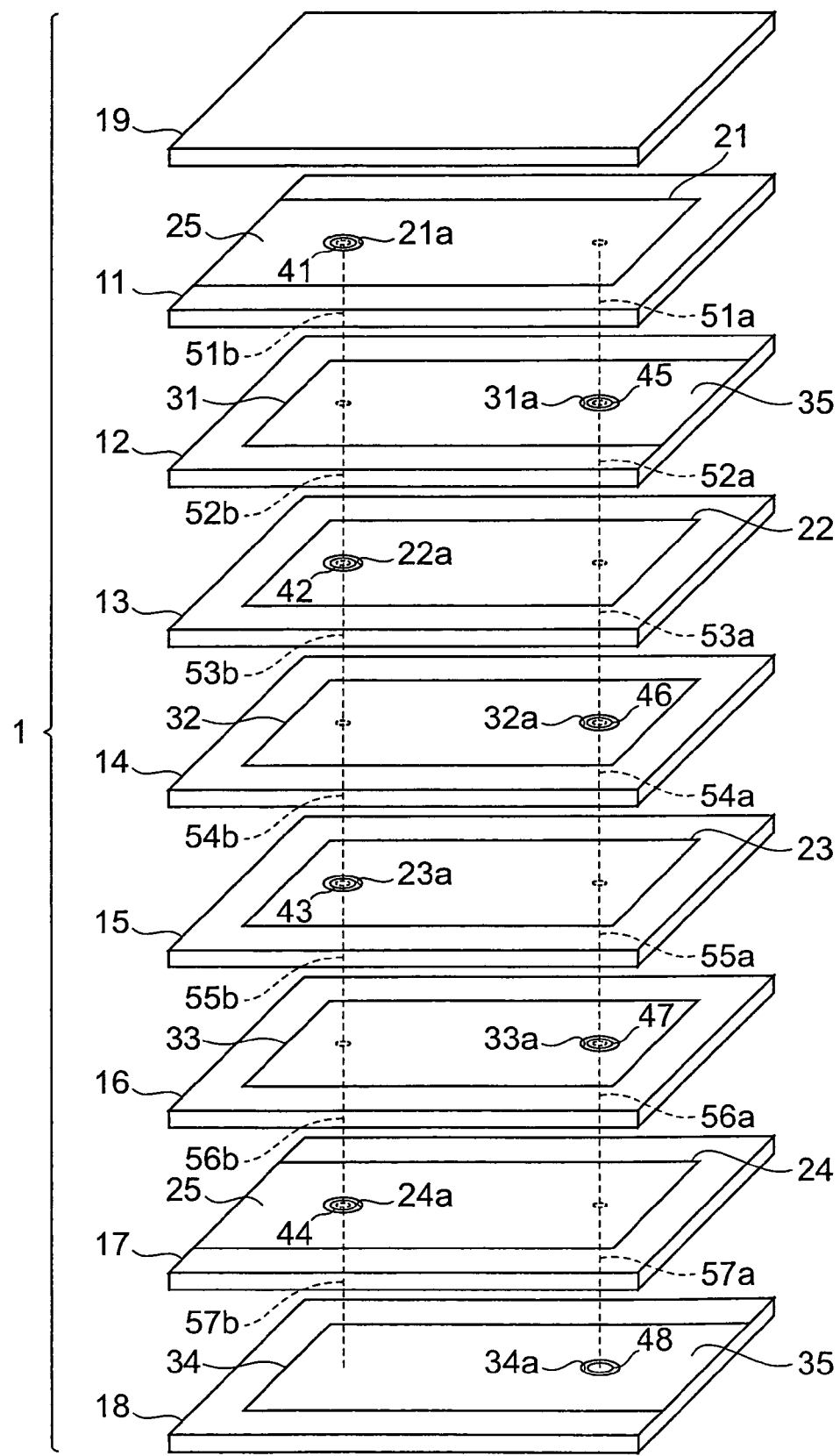
FIG. 10 is an exploded perspective view of the multilayer body included in the multilayer capacitor in accordance with the fifth embodiment.

With reference to FIGS. 9 and 10, the structure of the multilayer capacitor C5 in accordance with a fifth embodiment will be explained. The multilayer capacitor C5 in accordance with the fifth embodiment differs from the multilayer capacitor C1 in accordance with the first embodiment in terms of number of the first and second inner electrodes 21, 24, 31, 34 connected to the terminal electrodes 3, 5 by way of lead conductors 25, 35. FIG. 9 is a view for explaining a cross-sectional configuration of the multilayer capacitor in accordance with the fifth embodiment. FIG. 10 is an exploded perspective view of the multilayer body included in the multilayer capacitor in accordance with the fifth embodiment.

Among the four first inner electrodes 21 to 24 in the multilayer capacitor C5, two first inner electrodes 21, 24 are electrically connected to the first terminal electrode 3 by way of the lead conductors 25 as shown in FIGS. 9 and 10. This electrically connects the first inner electrodes 22, 23 to the first terminal electrode 3 as well, whereby the first inner electrodes 21 to 24 are connected in parallel. The lead conductors 25 are formed integrally with the first inner electrodes 21, 24, respectively, and extend therefrom so as to reach a side face 1a of the multilayer body 1.

Among the four second inner electrodes 31 to 34, two second inner electrodes 31, 34 are electrically connected to the second terminal electrode 5 by way of the lead conductors 35. This electrically connects the second inner electrodes 32, 33 to the second terminal electrode 5 as well, whereby the second inner electrodes 31 to 34 are connected in parallel. The lead conductors 35 are formed integrally with the second inner electrodes 31, 34, respectively, and extend therefrom so as to reach a side face 1b of the multilayer body 1.

In the multilayer capacitor C5, the number of first inner electrodes 21, 24 directly connected to the first terminal electrode 3 by way of the lead conductors 25 is 2, which is smaller than the total number of the first inner electrodes 21 to 24. In the multilayer capacitor C5, the number of second inner electrodes 31, 34 directly connected to the second terminal electrode 5 by way of the lead conductors 35 is 2, which is smaller than the total number of the second inner electrodes 31 to 34. These allow the multilayer capacitor C5 to yield an equivalent series resistance greater than that of a conventional multilayer capacitor in which all the inner electrodes are connected to their corresponding terminal electrodes by way of lead conductors.

In the multilayer capacitor C5, the number of first inner electrodes 21, 24 directly connected to the first terminal electrode 3 by way of the lead conductors 25 is greater than that in the multilayer capacitor C1, and these lead conductors 25 are connected in parallel to the first terminal electrode 3. Also, the number of second inner electrodes 31, 34 directly connected to the second terminal electrode 5 by way of the lead conductors 35 is greater, and these lead conductors 35 are connected in parallel to the second terminal electrode 5. Consequently, the multilayer capacitor C5 yields an equivalent series resistance smaller than that of the multilayer capacitor C1.

As in the foregoing, by adjusting the number of first inner electrodes 21, 24 electrically connected to the first terminal electrode 3 by way of the lead conductors 25 and the number of second inner electrodes 31, 34 electrically connected to the second terminal electrode 5 by way of the lead conductors 35, this embodiment sets the equivalent series resistance of the multilayer capacitor C5 to a desirable value and thus can regulate the equivalent series resistance easily with a high precision.

Sixth Embodiment

Figure 11:
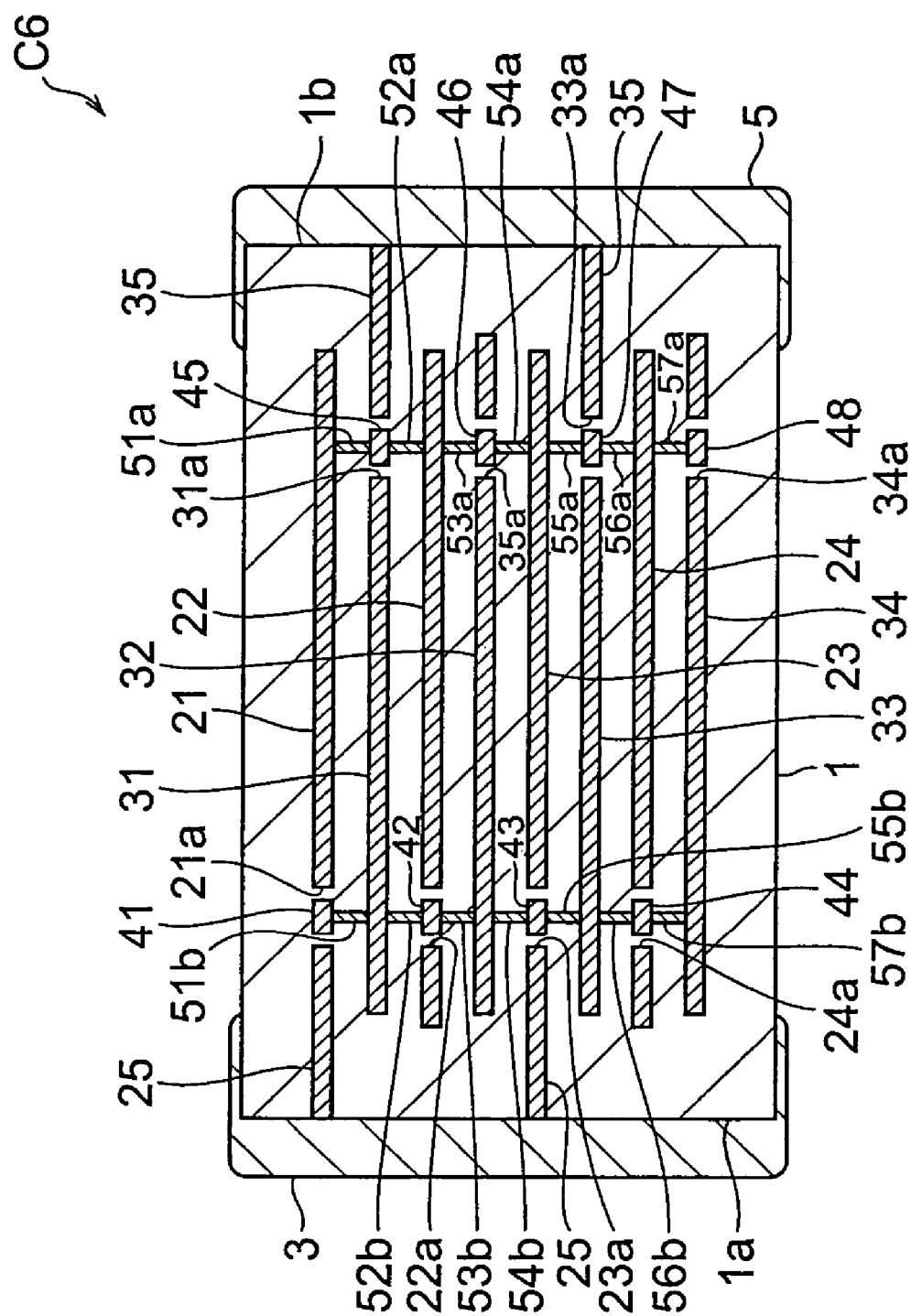
FIG. 11 is a view for explaining a cross-sectional configuration of the multilayer capacitor in accordance with a sixth embodiment.
Figure 12:
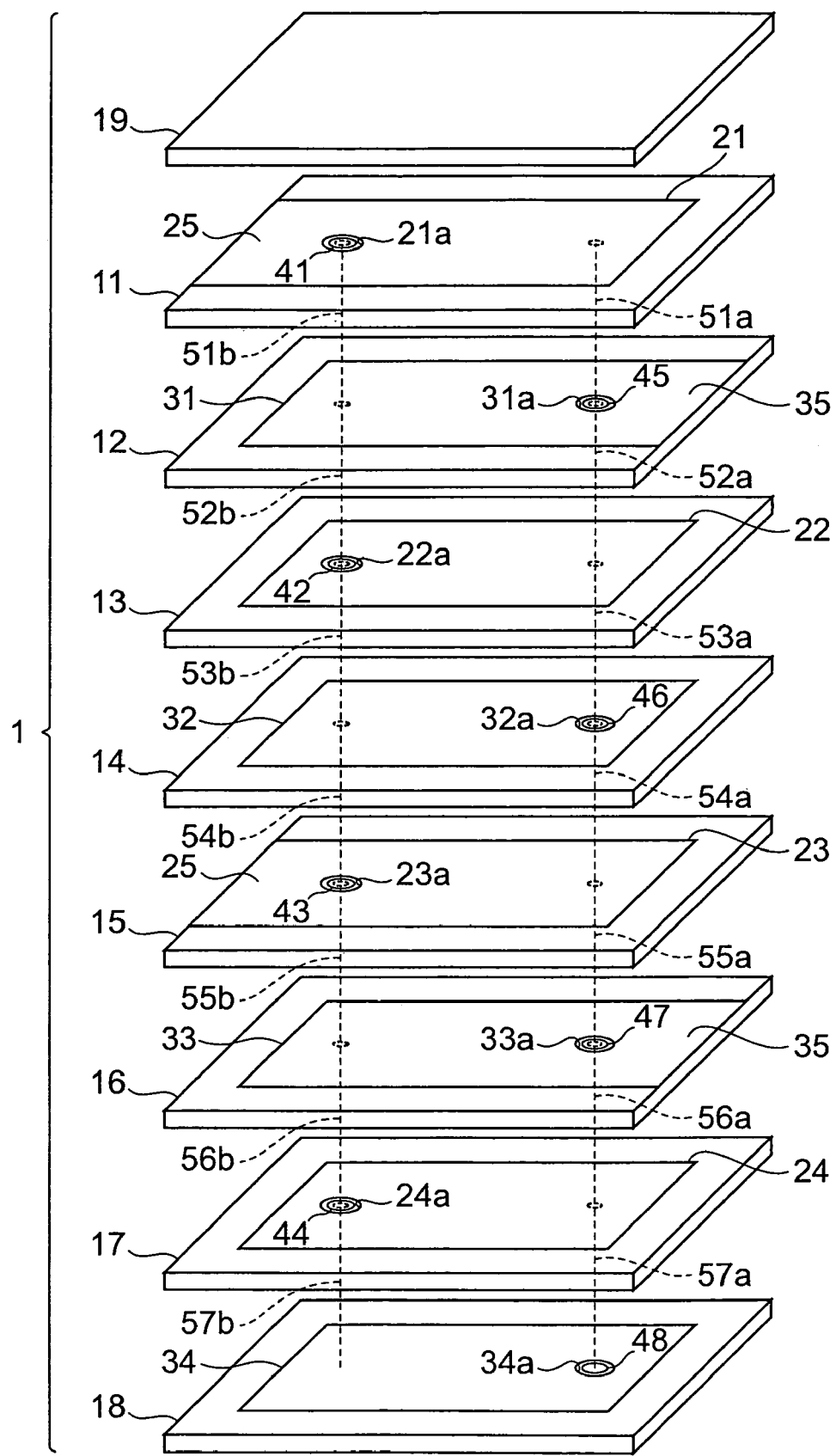
FIG. 12 is an exploded perspective view of the multilayer body included in the multilayer capacitor in accordance with the sixth embodiment.

With reference to FIGS. 11 and 12, the structure of the multilayer capacitor C6 in accordance with a sixth embodiment will be explained. The multilayer capacitor C6 in accordance with the sixth embodiment differs from the multilayer capacitor C2 in accordance with the second embodiment in terms of number of the first and second inner electrodes 21, 23, 31, 33 connected to the terminal electrodes 3, 5 by way of lead conductors 25, 35. FIG. 11 is a view for explaining a cross-sectional configuration of the multilayer capacitor in accordance with the sixth embodiment. FIG. 12 is an exploded perspective view of the multilayer body included in the multilayer capacitor in accordance with the sixth embodiment.

Among the four first inner electrodes 21 to 24 in the multilayer capacitor C6, two first inner electrodes 21, 23 are electrically connected to the first terminal electrode 3 by way of the lead conductors 25 as shown in FIGS. 11 and 12. This electrically connects the first inner electrodes 22, 24 to the first terminal electrode 3 as well, whereby the first inner electrodes 21 to 24 are connected in parallel. The lead conductors 25 are formed integrally with the first inner electrodes 21, 23, respectively, and extend therefrom so as to reach a side face 1a of the multilayer body 1.

Among the four second inner electrodes 31 to 34, two second inner electrodes 31, 33 are electrically connected to the second terminal electrode 5 by way of the lead conductors 35. This electrically connects the second inner electrodes 32, 34 to the second terminal electrode 5 as well, whereby the second inner electrodes 31 to 34 are connected in parallel. The lead conductors 35 are formed integrally with the second inner electrodes 31, 33, respectively, and extend therefrom so as to reach a side face 1b of the multilayer body 1.

In the multilayer capacitor C6, the number of first inner electrodes 21, 23 directly connected to the first terminal electrode 3 by way of the lead conductors 25 is 2, which is smaller than the total number of the first inner electrodes 21 to 24. In the multilayer capacitor C6, the number of second inner electrodes 31, 33 directly connected to the second terminal electrode 5 by way of the lead conductors 35 is 2, which is smaller than the total number of the second inner electrodes 31 to 34. These allow the multilayer capacitor C6 to yield an equivalent series resistance greater than that of a conventional multilayer capacitor in which all the inner electrodes are connected to their corresponding terminal electrodes by way of lead conductors.

In the multilayer capacitor C6, the number of first inner electrodes 21, 23 directly connected to the first terminal electrode 3 by way of the lead conductors 25 is greater than that in the multilayer capacitor C2, and these lead conductors 25 are connected in parallel to the first terminal electrode 3. Also, the number of second inner electrodes 31, 33 directly connected to the second terminal electrode 5 by way of the lead conductors 35 is greater, and these lead conductors 35 are connected in parallel to the second terminal electrode 5. Consequently, the multilayer capacitor C6 yields an equivalent series resistance smaller than that of the multilayer capacitor C2.

As in the foregoing, by adjusting the number of first inner electrodes 21, 23 electrically connected to the first terminal electrode 3 by way of the lead conductors 25 and the number of second inner electrodes 31, 33 electrically connected to the second terminal electrode 5 by way of the lead conductors 35, this embodiment sets the equivalent series resistance of the multilayer capacitor C6 to a desirable value and thus can regulate the equivalent series resistance easily with a high precision.

Seventh Embodiment

Figure 13:
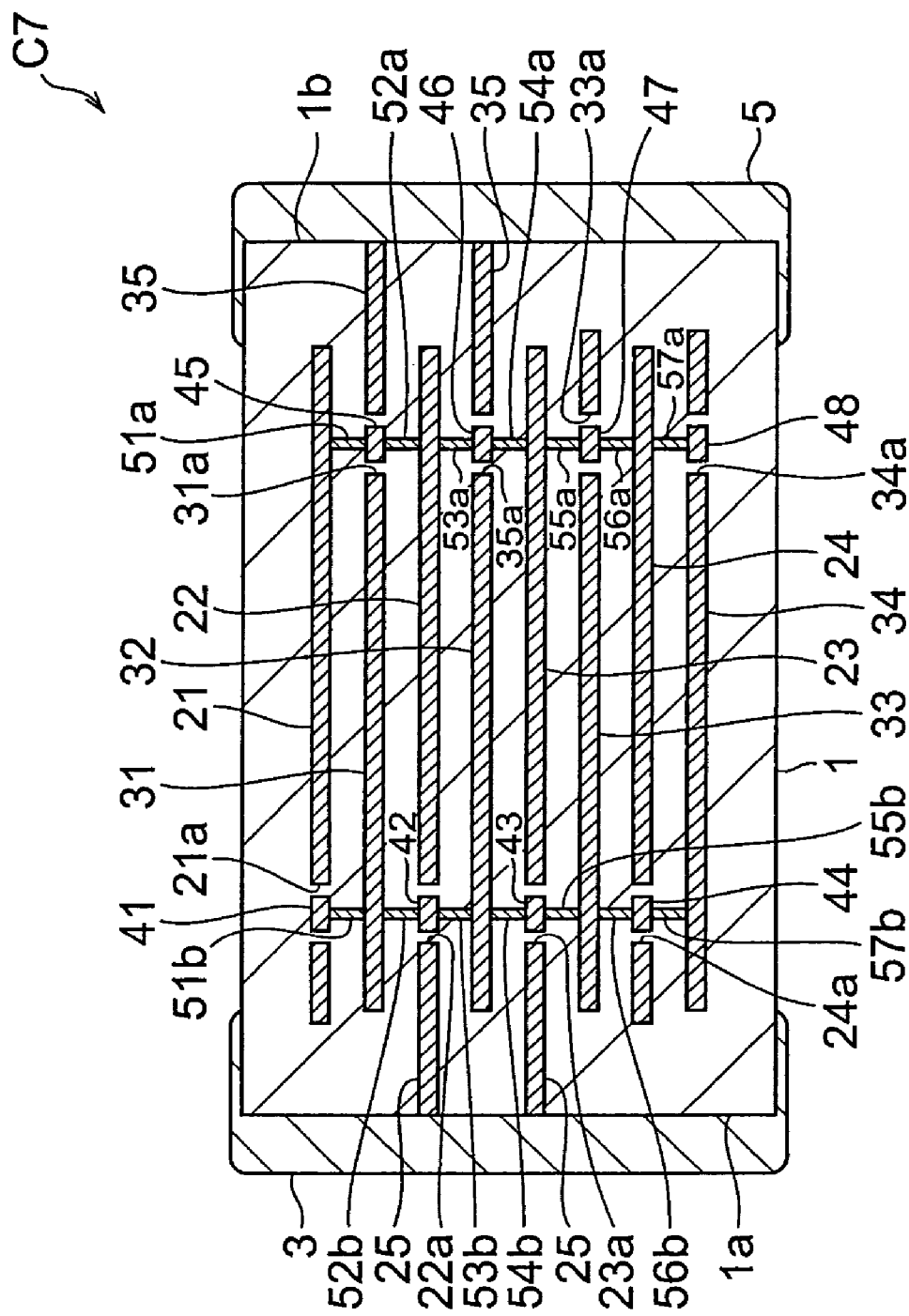
FIG. 13 is a view for explaining a cross-sectional configuration of the multilayer capacitor in accordance with a seventh embodiment.
Figure 14:
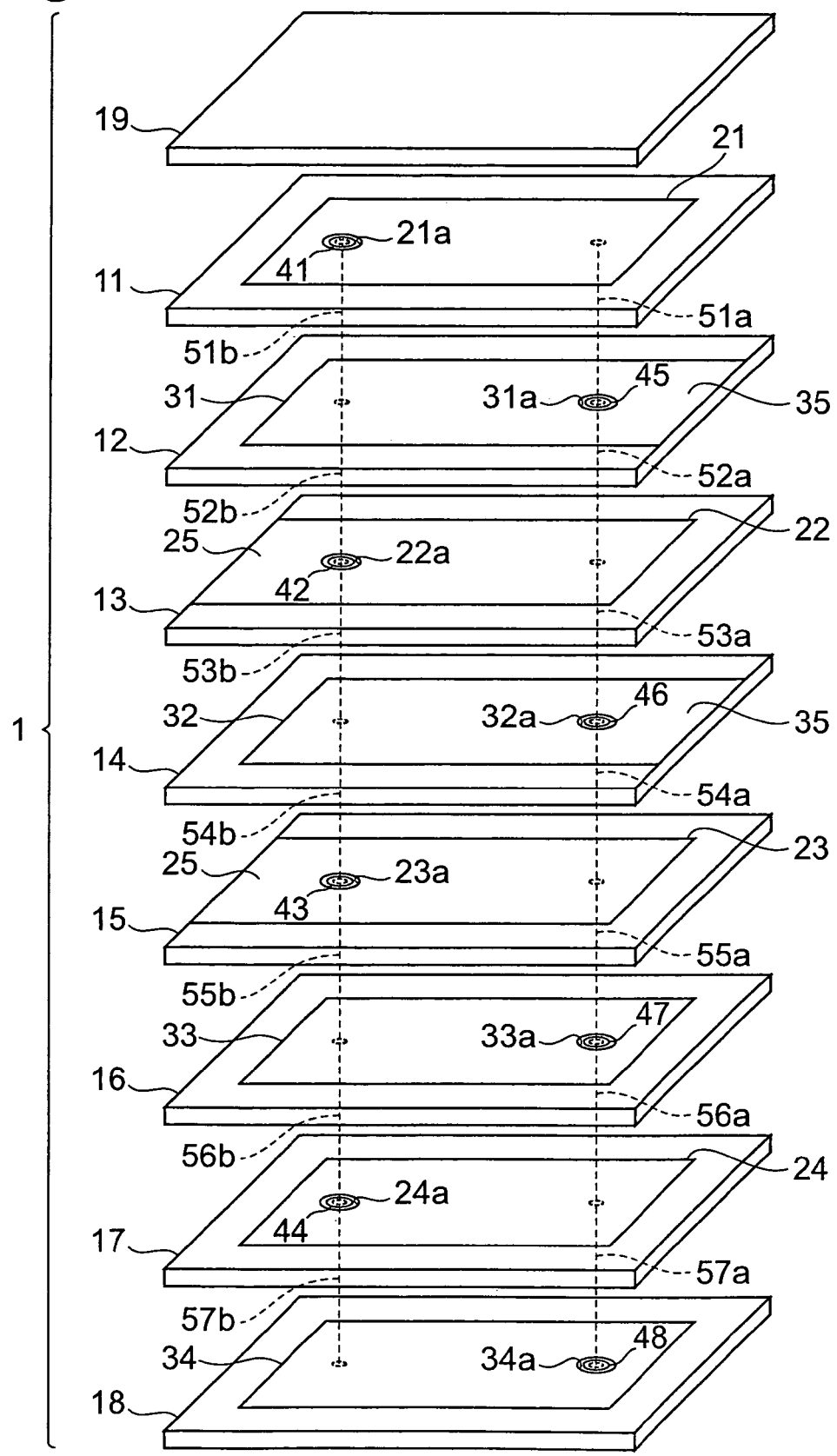
FIG. 14 is an exploded perspective view of the multilayer body included in the multilayer capacitor in accordance with the seventh embodiment.

With reference to FIGS. 13 and 14, the structure of the multilayer capacitor C7 in accordance with a seventh embodiment will be explained. The multilayer capacitor C7 in accordance with the seventh embodiment differs from the multilayer capacitor C3 in accordance with the third embodiment in terms of number of the first and second inner electrodes 22, 23, 31, 32 connected to the terminal electrodes 3, 5 by way of lead conductors 25, 35. FIG. 13 is a view for explaining a cross-sectional configuration of the multilayer capacitor in accordance with the seventh embodiment. FIG. 14 is an exploded perspective view of the multilayer body included in the multilayer capacitor in accordance with the seventh embodiment.

Among the four first inner electrodes 21 to 24 in the multilayer capacitor C7, two first inner electrodes 22, 23 are electrically connected to the first terminal electrode 3 by way of the lead conductors 25 as shown in FIGS. 13 and 14. This electrically connects the first inner electrodes 21, 24 to the first terminal electrode 3 as well, whereby the first inner electrodes 21 to 24 are connected in parallel. The lead conductors 25 are formed integrally with the first inner electrodes 21, 24, respectively, and extend therefrom so as to reach a side face 1a of the multilayer body 1.

Among the four second inner electrodes 31 to 34, two second inner electrodes 31, 32 are electrically connected to the second terminal electrode 5 by way of the lead conductors 35. This electrically connects the second inner electrodes 33, 34 to the second terminal electrode 5 as well, whereby the second inner electrodes 31 to 34 are connected in parallel. The lead conductors 35 are formed integrally with the second inner electrodes 31, 32, respectively, and extend therefrom so as to reach a side face 1b of the multilayer body 1.

In the multilayer capacitor C7, the number of first inner electrodes 22, 23 directly connected to the first terminal electrode 3 by way of the lead conductors 25 is 2, which is smaller than the total number of the first inner electrodes 21 to 24. In the multilayer capacitor C7, the number of second inner electrodes 31, 32 directly connected to the second terminal electrode 5 by way of the lead conductors 35 is 2, which is smaller than the total number of the second inner electrodes 31 to 34. These allow the multilayer capacitor C7 to yield an equivalent series resistance greater than that of a conventional multilayer capacitor in which all the inner electrodes are connected to their corresponding terminal electrodes by way of lead conductors.

In the multilayer capacitor C7, the number of first inner electrodes 22, 23 directly connected to the first terminal electrode 3 by way of the lead conductors 25 is greater than that in the multilayer capacitor C3, and these lead conductors 25 are connected in parallel to the first terminal electrode 3. Also, the number of second inner electrodes 31, 32 directly connected to the second terminal electrode 5 by way of the lead conductors 35 is greater, and these lead conductors 35 are connected in parallel to the second terminal electrode 5. Consequently, the multilayer capacitor C7 yields an equivalent series resistance smaller than that of the multilayer capacitor C3.

As in the foregoing, by adjusting the number of first inner electrodes 22, 23 electrically connected to the first terminal electrode 3 by way of the lead conductors 25 and the number of second inner electrodes 31, 32 electrically connected to the second terminal electrode 5 by way of the lead conductors 35, this embodiment sets the equivalent series resistance of the multilayer capacitor C7 to a desirable value and thus can regulate the equivalent series resistance easily with a high precision.

Eighth Embodiment

Figure 15:
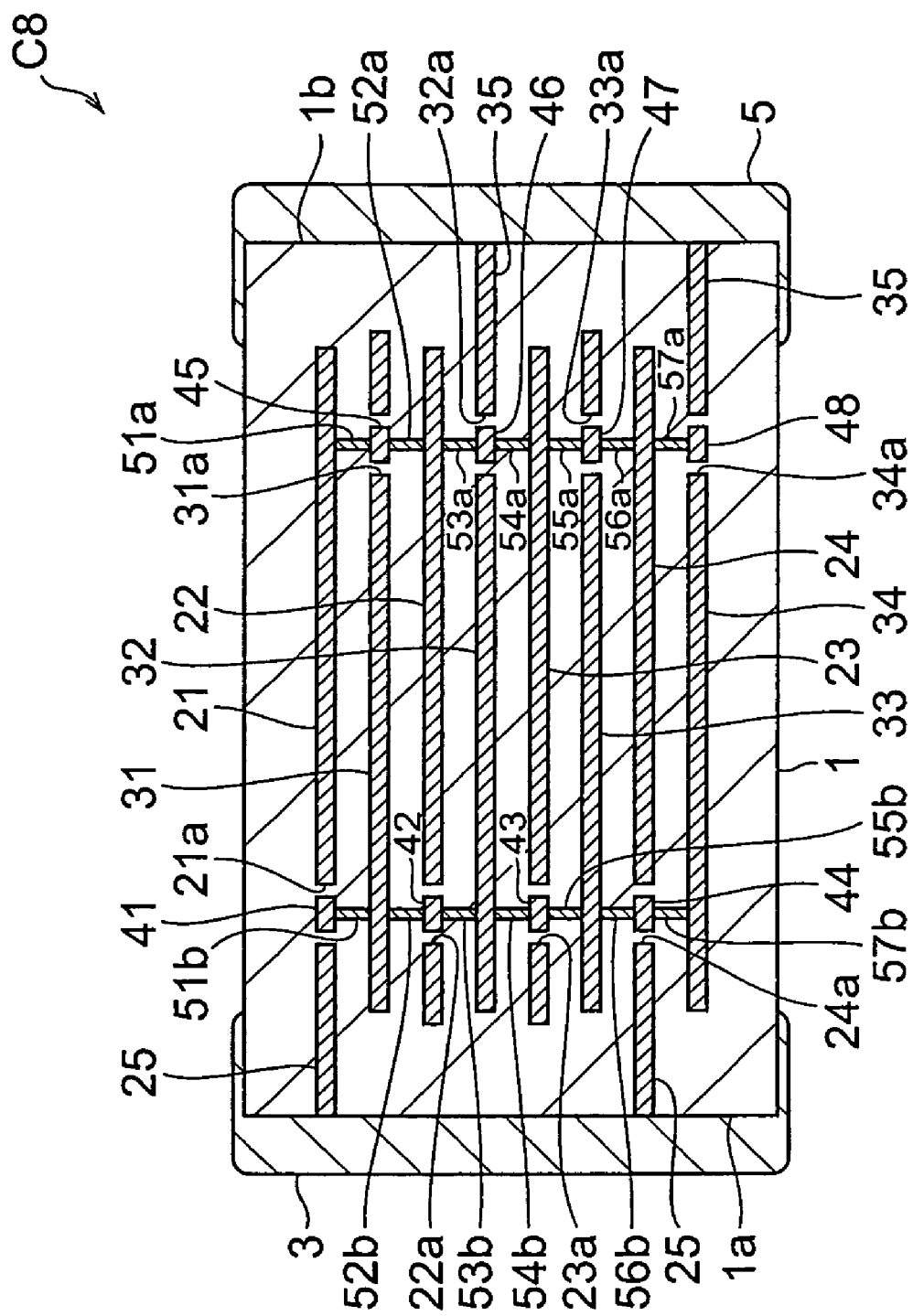
FIG. 15 is a view for explaining a cross-sectional configuration of the multilayer capacitor in accordance with an eighth embodiment.
Figure 16:
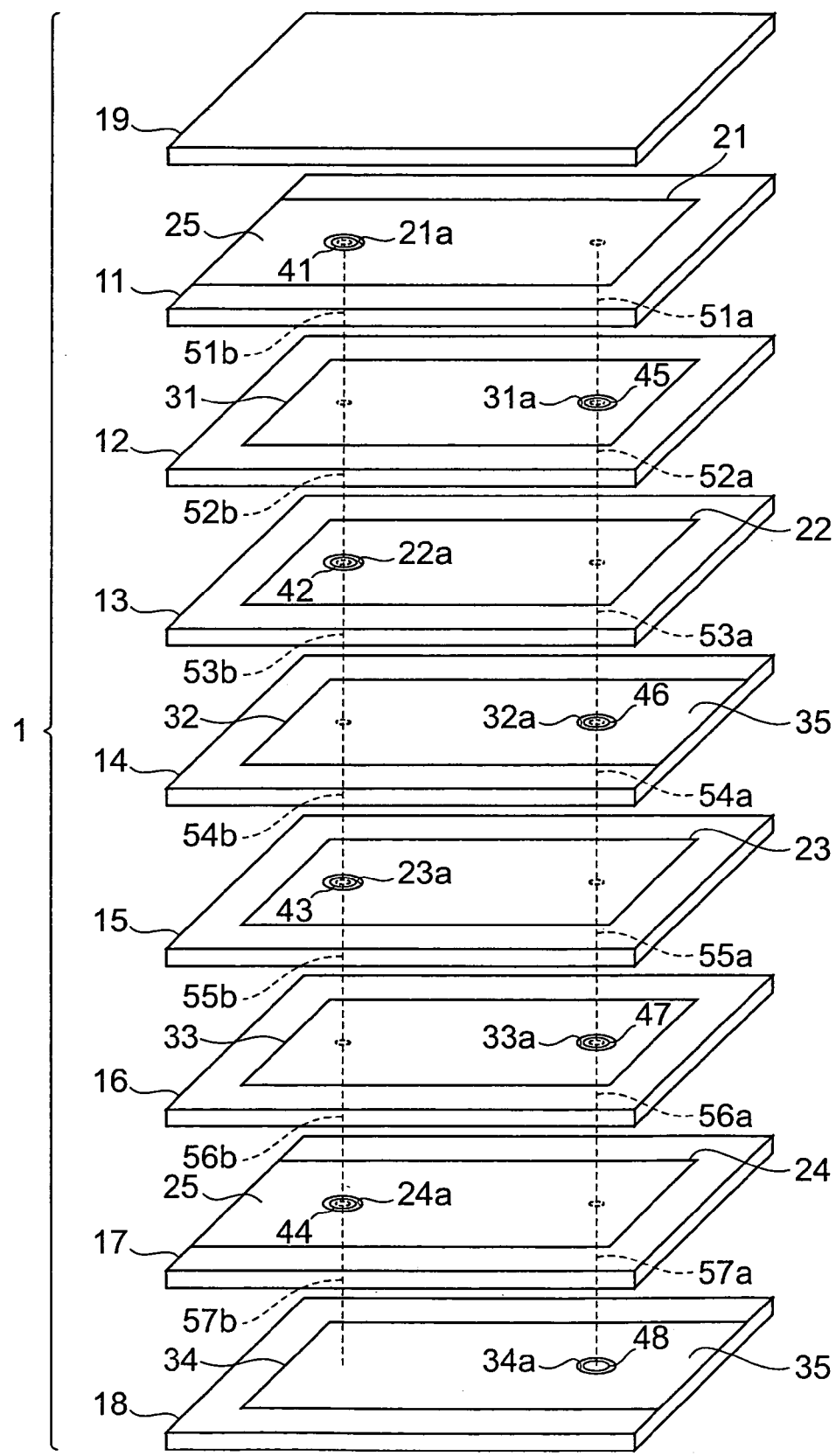
FIG. 16 is an exploded perspective view of the multilayer body included in the multilayer capacitor in accordance with the eighth embodiment.

With reference to FIGS. 15 and 16, the structure of the multilayer capacitor C8 in accordance with an eighth embodiment will be explained. The multilayer capacitor C8 in accordance with the eighth embodiment differs from the multilayer capacitor C4 in accordance with the fourth embodiment in terms of number of the first and second inner electrodes 21, 24, 32, 34 connected to the terminal electrodes 3, 5 by way of lead conductors 25, 35. FIG. 15 is a view for explaining a cross-sectional configuration of the multilayer capacitor in accordance with the eighth embodiment. FIG. 16 is an exploded perspective view of the multilayer body included in the multilayer capacitor in accordance with the eighth embodiment.

Among the four first inner electrodes 21 to 24 in the multilayer capacitor C8, two first inner electrodes 21, 24 are electrically connected to the first terminal electrode 3 by way of the lead conductors 25 as shown in FIGS. 15 and 16. This electrically connects the first inner electrodes 22, 23 to the first terminal electrode 3 as well, whereby the first inner electrodes 21 to 24 are connected in parallel. The lead conductors 25 are formed integrally with the first inner electrodes 21, 24, respectively, and extend therefrom so as to reach a side face 1a of the multilayer body 1.

Among the four second inner electrodes 31 to 34, two second inner electrodes 32, 34 are electrically connected to the second terminal electrode 5 by way of the lead conductors 35. This electrically connects the second inner electrodes 31, 33 to the second terminal electrode 5 as well, whereby the second inner electrodes 31 to 34 are connected in parallel. The lead conductors 35 are formed integrally with the second inner electrodes 32, 34, respectively, and extend therefrom so as to reach a side face 1b of the multilayer body 1.

In the multilayer capacitor C8, the number of first inner electrodes 21, 24 directly connected to the first terminal electrode 3 by way of the lead conductors 25 is 2, which is smaller than the total number of the first inner electrodes 21 to 24. In the multilayer capacitor C8, the number of second inner electrodes 32, 34 directly connected to the second terminal electrode 5 by way of the lead conductors 35 is 2, which is smaller than the total number of the second inner electrodes 31 to 34. These allow the multilayer capacitor C8 to yield an equivalent series resistance greater than that of a conventional multilayer capacitor in which all the inner electrodes are connected to their corresponding terminal electrodes by way of lead conductors.

In the multilayer capacitor C8, the number of first inner electrodes 21, 24 directly connected to the first terminal electrode 3 by way of the lead conductors 25 is greater than that in the multilayer capacitor C4, and these lead conductors 25 are connected in parallel to the first terminal electrode 3. Also, the number of second inner electrodes 32, 34 directly connected to the second terminal electrode 5 by way of the lead conductors 35 is greater, and these lead conductors 35 are connected in parallel to the second terminal electrode 5. Consequently, the multilayer capacitor C8 yields an equivalent series resistance smaller than that of the multilayer capacitor C4.

As in the foregoing, by adjusting the number of first inner electrodes 21, 24 electrically connected to the first terminal electrode 3 by way of the lead conductors 25 and the number of second inner electrodes 32, 34 electrically connected to the second terminal electrode 5 by way of the lead conductors 35, this embodiment sets the equivalent series resistance of the multilayer capacitor C8 to a desirable value and thus can regulate the equivalent series resistance easily with a high precision.

Ninth Embodiment

Figure 17:
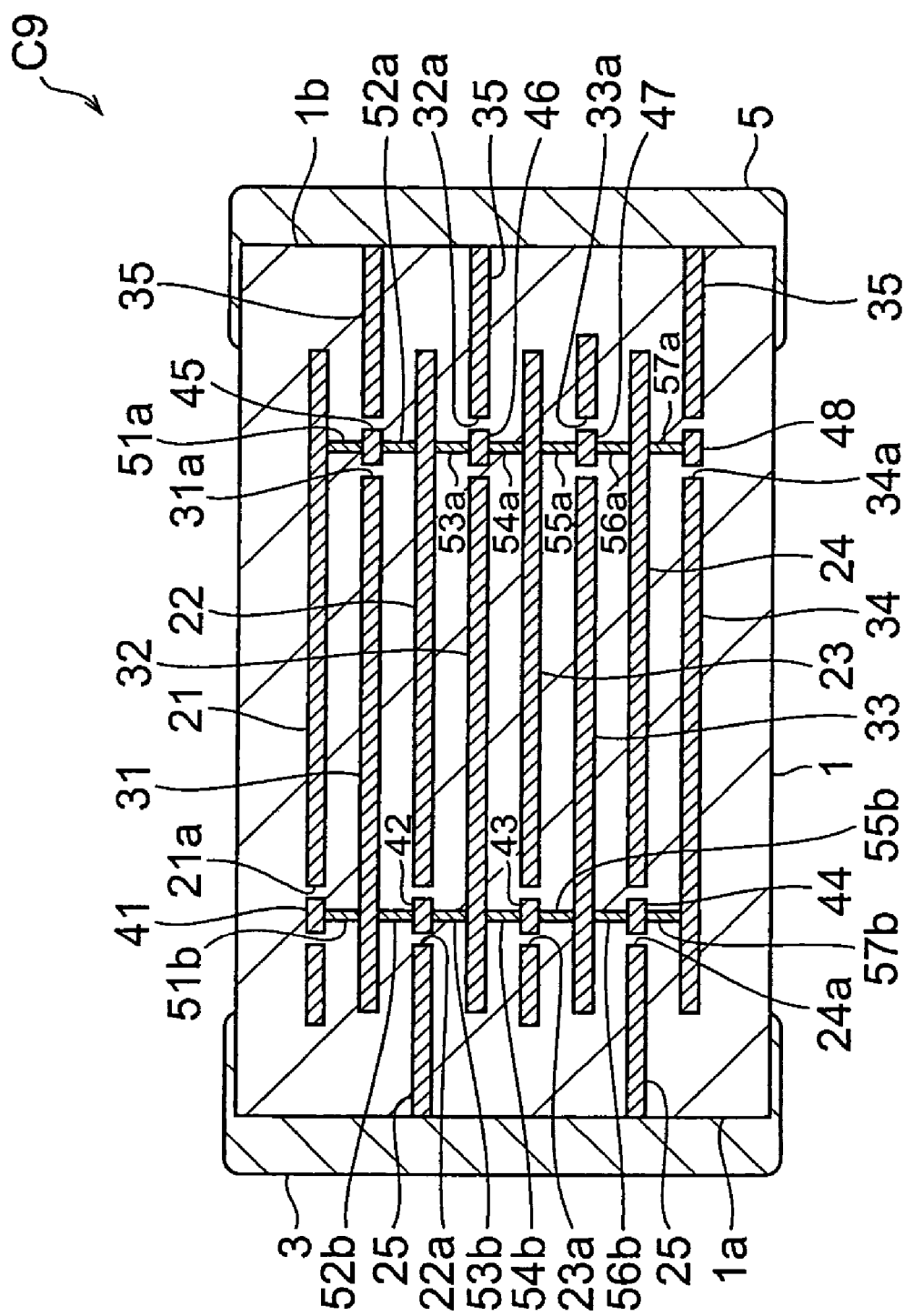
FIG. 17 is a view for explaining a cross-sectional configuration of the multilayer capacitor in accordance with a ninth embodiment.
Figure 18:
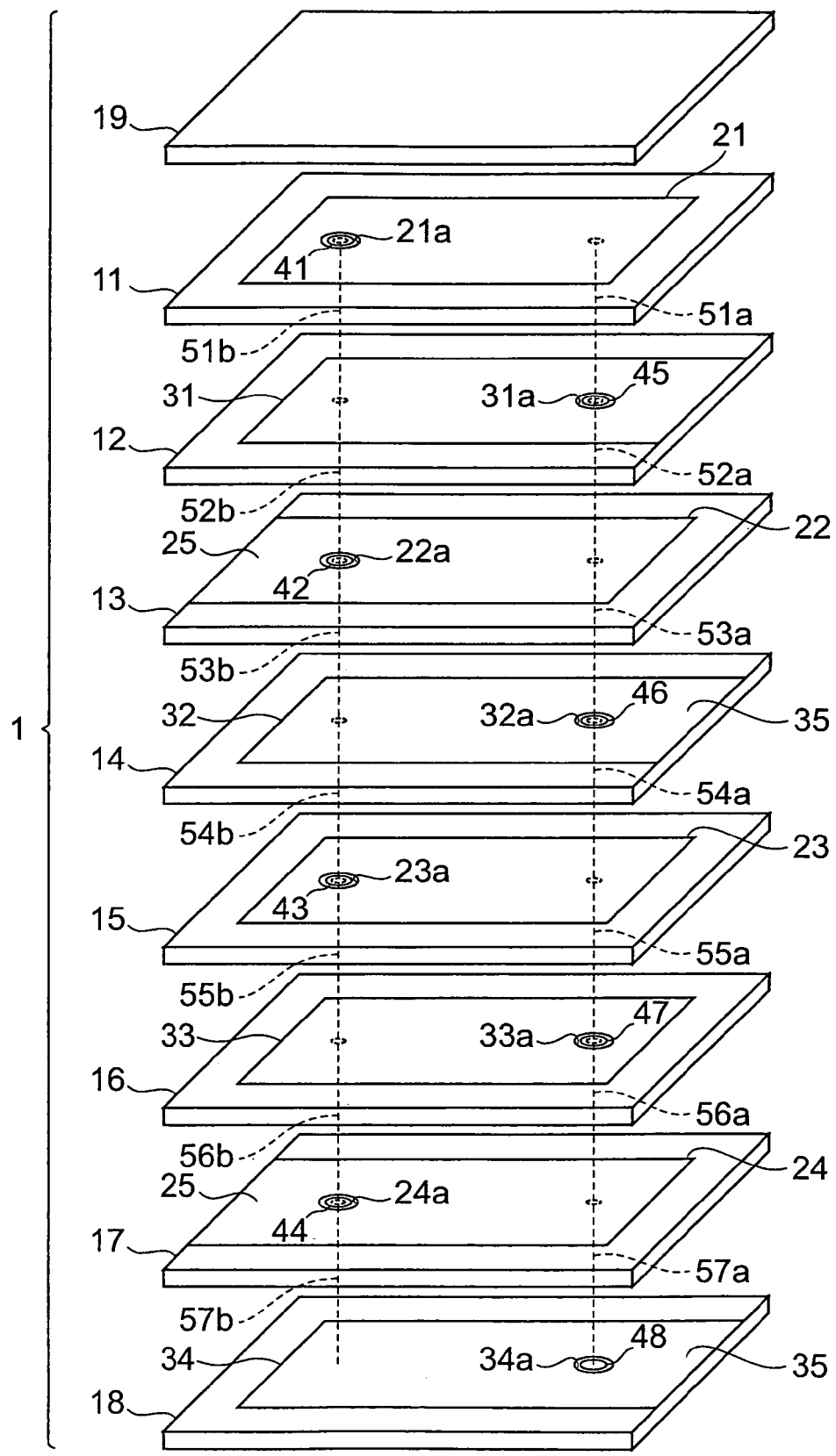
FIG. 18 is an exploded perspective view of the multilayer body included in the multilayer capacitor in accordance with the ninth embodiment.

With reference to FIGS. 17 and 18, the structure of the multilayer capacitor C9 in accordance with a ninth embodiment will be explained. The multilayer capacitor C9 in accordance with the ninth embodiment differs from the multilayer capacitor C4 in accordance with the fourth embodiment in terms of number of the first and second inner electrodes 22, 24, 31, 32, 34 connected to the terminal electrodes 3, 5 by way of lead conductors 25, 35. FIG. 17 is a view for explaining a cross-sectional configuration of the multilayer capacitor in accordance with the ninth embodiment. FIG. 18 is an exploded perspective view of the multilayer body included in the multilayer capacitor in accordance with the ninth embodiment.

Among the four first inner electrodes 21 to 24 in the multilayer capacitor C9, two first inner electrodes 22, 24 are electrically connected to the first terminal electrode 3 by way of the lead conductors 25 as shown in FIGS. 17 and 18. This electrically connects the first inner electrodes 21, 23 to the first terminal electrode 3 as well, whereby the first inner electrodes 21 to 24 are connected in parallel. The lead conductors 25 are formed integrally with the first inner electrodes 22, 24, respectively, and extend therefrom so as to reach a side face 1a of the multilayer body 1.

Among the four second inner electrodes 31 to 34, three second inner electrodes 31, 32, 34 are electrically connected to the second terminal electrode 5 by way of the lead conductors 35. This electrically connects the second inner electrode 33 to the second terminal electrode 5 as well, whereby the second inner electrodes 31 to 34 are connected in parallel. The lead conductors 35 are formed integrally with the second inner electrodes 31, 32, 34, respectively, and extend therefrom so as to reach a side face 1b of the multilayer body 1.

In the multilayer capacitor C9, the number of first inner electrodes 22, 24 directly connected to the first terminal electrode 3 by way of the lead conductors 25 is 2, which is smaller than the total number of the first inner electrodes 21 to 24. In the multilayer capacitor C9, the number of second inner electrodes 31, 32, 34 directly connected to the second terminal electrode 5 by way of the lead conductors 35 is 3, which is smaller than the total number of the second inner electrodes 31 to 34. These allow the multilayer capacitor C9 to yield an equivalent series resistance greater than that of a conventional multilayer capacitor in which all the inner electrodes are connected to their corresponding terminal electrodes by way of lead conductors.

In the multilayer capacitor C9, the number of first inner electrodes 22, 24 directly connected to the first terminal electrode 3 by way of the lead conductors 25 is greater than that in the multilayer capacitor C4, and these lead conductors 25 are connected in parallel to the first terminal electrode 3. Also, the number of second inner electrodes 31, 32, 34 directly connected to the second terminal electrode 5 by way of the lead conductors 35 is greater, and these lead conductors 35 are connected in parallel to the second terminal electrode 5. Consequently, the multilayer capacitor C9 yields an equivalent series resistance smaller than that of the multilayer capacitor C4.

As in the foregoing, by adjusting the number of first inner electrodes 22, 24 electrically connected to the first terminal electrode 3 by way of the lead conductors 25 and the number of second inner electrodes 31, 32, 34 electrically connected to the second terminal electrode 5 by way of the lead conductors 35, this embodiment sets the equivalent series resistance of the multilayer capacitor C9 to a desirable value and thus can regulate the equivalent series resistance easily with a high precision.

Tenth Embodiment

Figure 19:
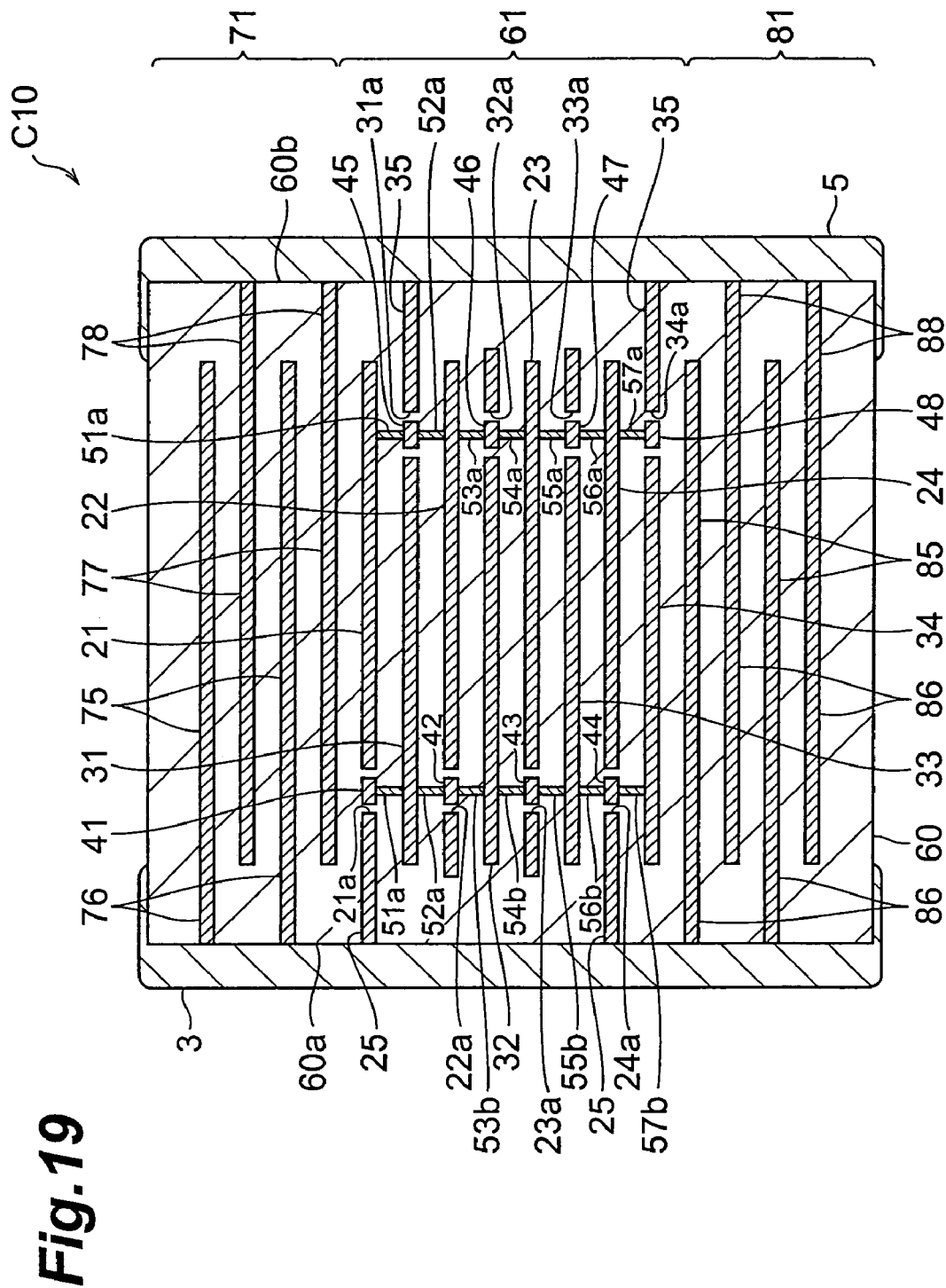
FIG. 19 is a view for explaining a cross-sectional configuration of the multilayer capacitor in accordance with a tenth embodiment.
Figure 20:
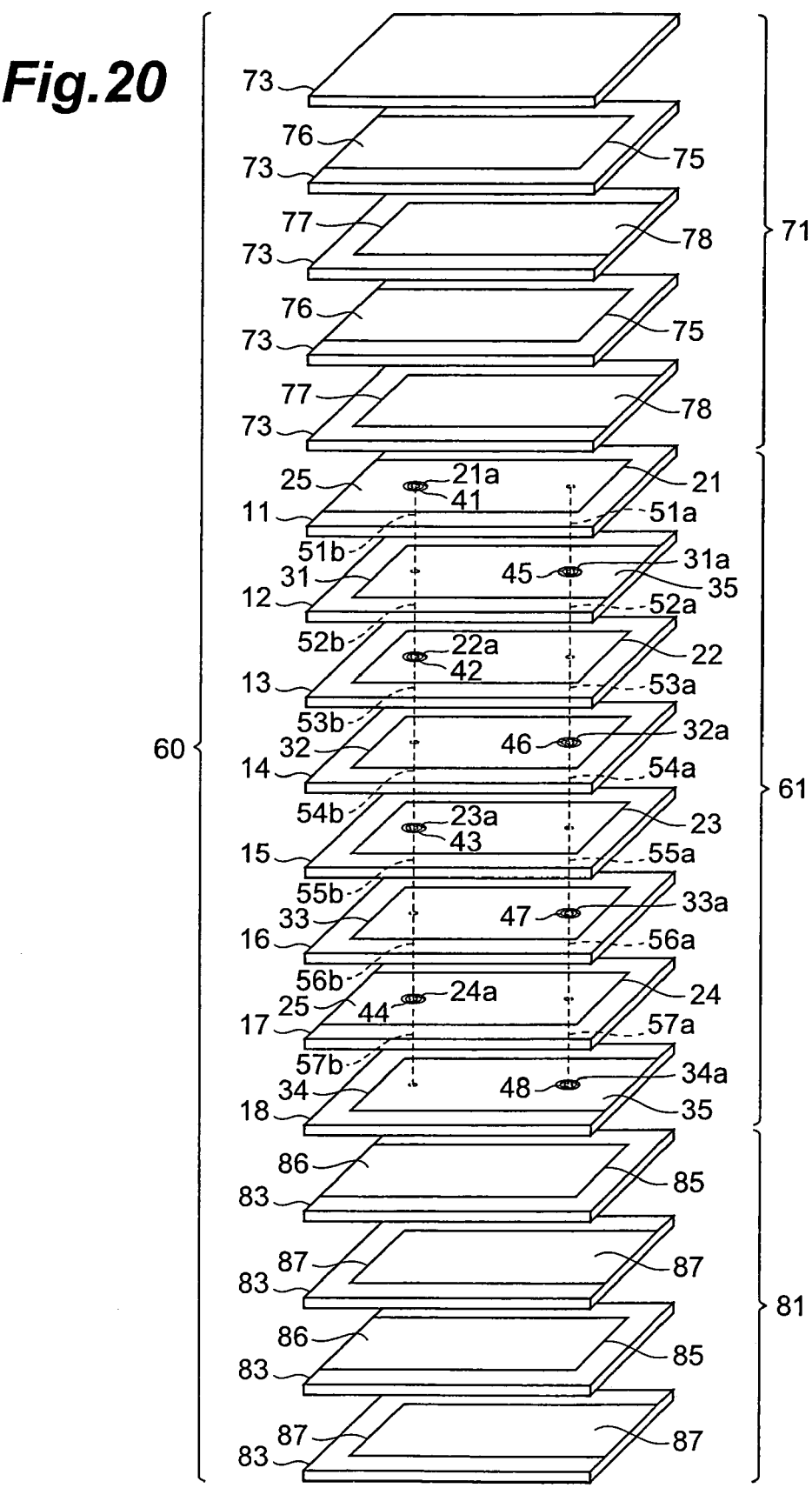
FIG. 20 is an exploded perspective view of the multilayer body included in the multilayer capacitor in accordance with the tenth embodiment.

With reference to FIGS. 19 and 20, the structure of the multilayer capacitor C10 in accordance with a tenth embodiment will be explained. FIG. 19 is a view for explaining a cross-sectional configuration of the multilayer capacitor in accordance with the tenth embodiment. FIG. 20 is an exploded perspective view of the multilayer body included in the multilayer capacitor in accordance with the tenth embodiment.

As shown in FIG. 19, the multilayer capacitor C10 comprises a multilayer body 60, and first and second terminal electrodes 3, 5 formed on the multilayer body 60. The multilayer body 60 includes first to third capacitor portions 61, 71, 81 as also shown in FIG. 20. The first capacitor portion 61 is positioned between the second capacitor portion 71 and third capacitor portion 81. The first terminal electrode 3 is positioned on the side of a side face 60a of the multilayer body 60. The second terminal electrode 5 is positioned on the side of a side face 60b of the multilayer body 60.

To begin with, the configuration of the first capacitor portion 61 will be explained. The first capacitor portion 61 has the same configuration as with the multilayer body 1 in the multilayer capacitor C5 in accordance with the fifth embodiment except for the dielectric layer 19. Namely, the first capacitor portion 61 is constructed by alternately laminating a plurality of (8 in this embodiment) dielectric layers 11 to 18 and a plurality of (4 each in this embodiment) first and second internal electrodes 21 to 24, 31 to 34. Among the four first inner electrodes 21 to 24 in the first capacitor portion 61, two first inner electrodes 21, 24 are electrically connected to the first terminal electrode 3 by way of lead conductors 25. Among the four second inner electrodes 31 to 34 in the first capacitor portion 61, two second inner electrodes 31, 34 are electrically connected to the second terminal electrode 5 by way of lead conductors 35.

The configuration of the second capacitor portion 71 will now be explained. The second capacitor portion 71 is constructed by alternately laminating a plurality of (5 in this embodiment) dielectric layers 73 and a plurality of (2 each in this embodiment) first and second internal electrodes 75, 77. The first inner electrodes 75 are electrically connected to the first terminal electrode 3 by way of respective lead conductors 76. The lead conductors 76 are formed integrally with their corresponding first inner electrodes 75 and extend therefrom so as to reach the side face 60a of the multilayer body 60. The second inner electrodes 77 are electrically connected to the second terminal electrode 5 by way of respective lead conductors 78. The lead conductors 78 are formed integrally with their corresponding first inner electrodes 77 and extend therefrom so as to reach the side face 60b of the multilayer body 60.

The configuration of the third capacitor portion 81 will now be explained. The third capacitor portion 81 is constructed by alternately laminating a plurality of (4 in this embodiment) dielectric layers 83 and a plurality of (2 each in this embodiment) first and second internal electrodes 85, 87. The first inner electrodes 85 are electrically connected to the first terminal electrode 3 by way of respective lead conductors 86. The lead conductors 86 are formed integrally with their corresponding first inner electrodes 85 and extend therefrom so as to reach the side face 60a of the multilayer body 60. The second inner electrodes 87 are electrically connected to the second terminal electrode 5 by way of respective lead conductors 88. The lead conductors 88 are formed integrally with their corresponding first inner electrodes 87 and extend therefrom so as to reach the side face 60b of the multilayer body 60.

In the actual multilayer capacitor C10, the dielectric layers 11 to 18, 73, 83 are integrated together to such an extent that no boundaries are discernible therebetween. The inner electrodes 21 to 24 of the first capacitor portion 61 are electrically connected to the inner electrodes 75, 85 of the second and third capacitor portions 71, 81 by way of the terminal electrode 3. The inner electrodes 31 to 34 of the first capacitor portion 61 are electrically connected to the inner electrodes 77, 87 of the second and third capacitor portions 71, 81 by way of the terminal electrode 5.

Since the first capacitor portion 61 is provided as in the foregoing, this embodiment sets the equivalent series resistance of the multilayer capacitor C10 to a desirable value and thus can regulate the equivalent series resistance easily with a high precision as described in the fifth embodiment.

Eleventh Embodiment

Figure 21:
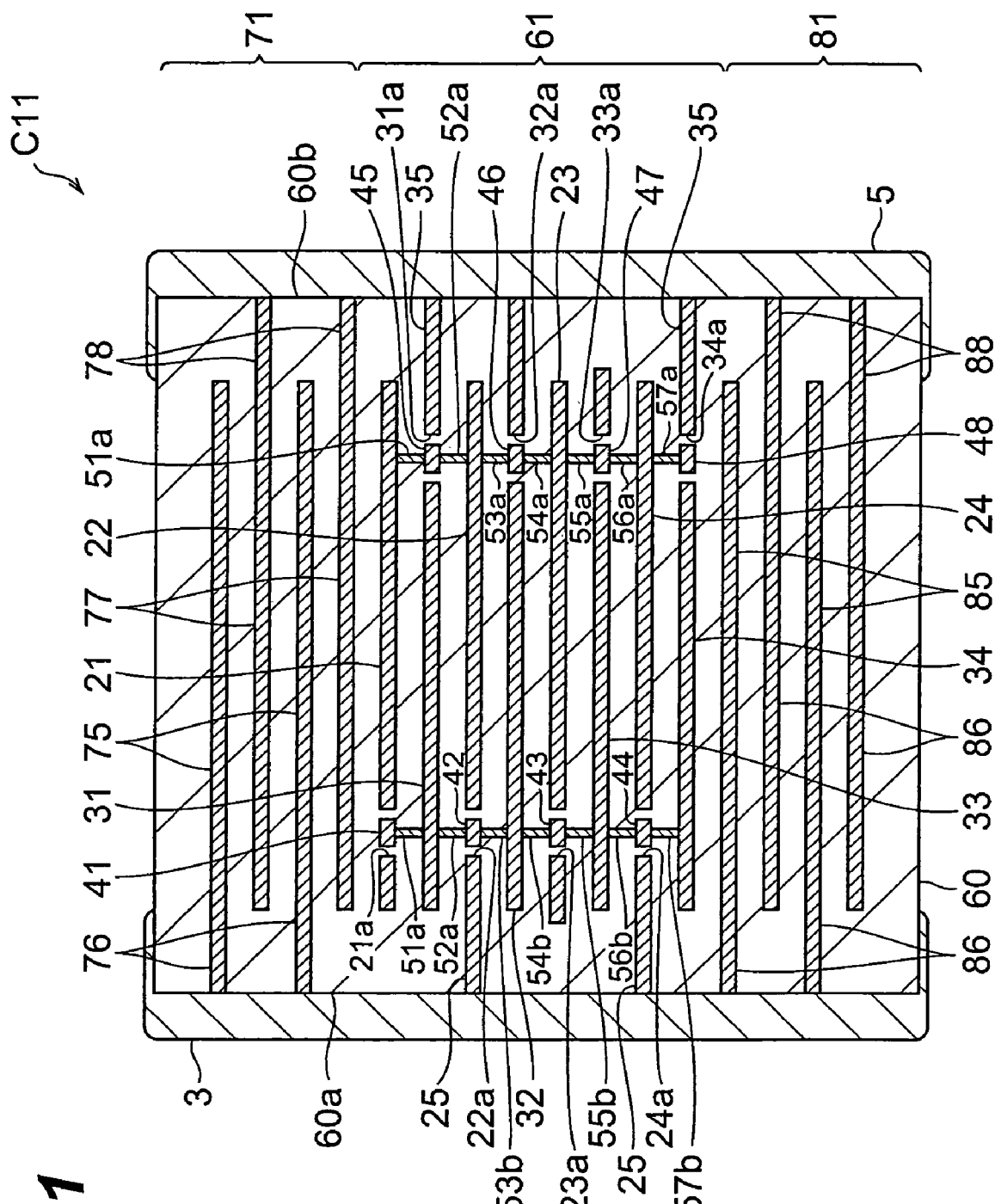
FIG. 21 is a view for explaining a cross-sectional configuration of the multilayer capacitor in accordance with an eleventh embodiment.
Figure 22:
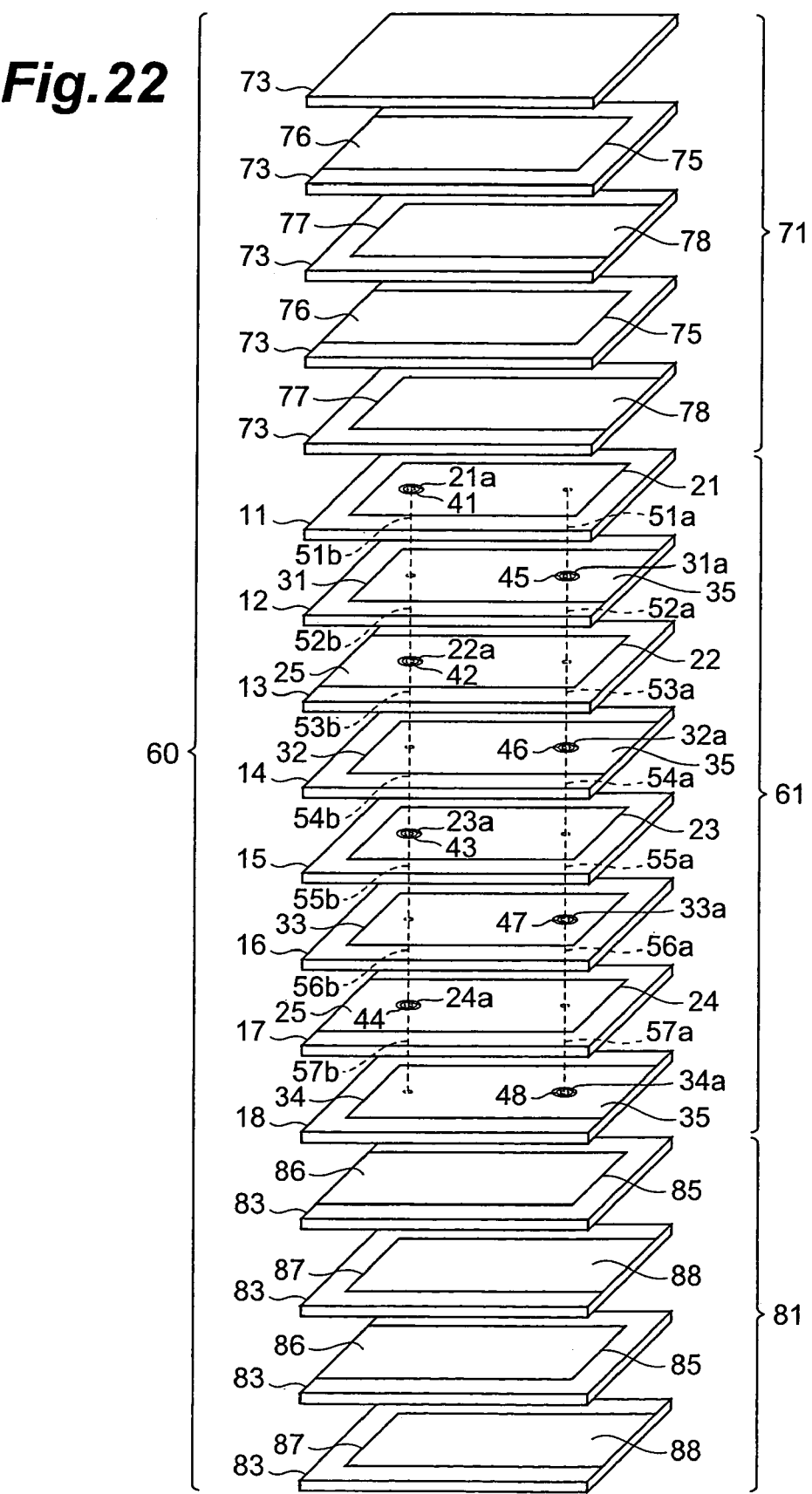
FIG. 22 is an exploded perspective view of the multilayer body included in the multilayer capacitor in accordance with the eleventh embodiment.

With reference to FIGS. 21 and 22, the structure of the multilayer capacitor C11 in accordance with an eleventh embodiment will be explained. The multilayer capacitor C11 in accordance with the eleventh embodiment differs from the multilayer capacitor C10 in accordance with the tenth embodiment in terms of configuration of the first capacitor portion 61. FIG. 21 is a view for explaining a cross-sectional configuration of the multilayer capacitor in accordance with the eleventh embodiment. FIG. 22 is an exploded perspective view of the multilayer body included in the multilayer capacitor in accordance with the eleventh embodiment.

The first capacitor portion 61 has the same configuration as with the multilayer body 1 in the multilayer capacitor C7 in accordance with the seventh embodiment except for the dielectric layer 19. Namely, the first capacitor portion 61 is constructed by alternately laminating a plurality of (8 in this embodiment) dielectric layers 11 to 18 and a plurality of (4 each in this embodiment) first and second internal electrodes 21 to 24, 31 to 34. Among the four first inner electrodes 21 to 24 in the first capacitor portion 61, two first inner electrodes 22, 23 are electrically connected to the first terminal electrode 3 by way of lead conductors 25. Among the four second inner electrodes 31 to 34 in the first capacitor portion 61, two second inner electrodes 31, 32 are electrically connected to the second terminal electrode 5 by way of lead conductors 35.

Since the first capacitor portion 61 is provided as in the foregoing, this embodiment sets the equivalent series resistance of the multilayer capacitor C11 to a desirable value and thus can regulate the equivalent series resistance easily with a high precision as described in the seventh embodiment.

Twelfth Embodiment

Figure 23:
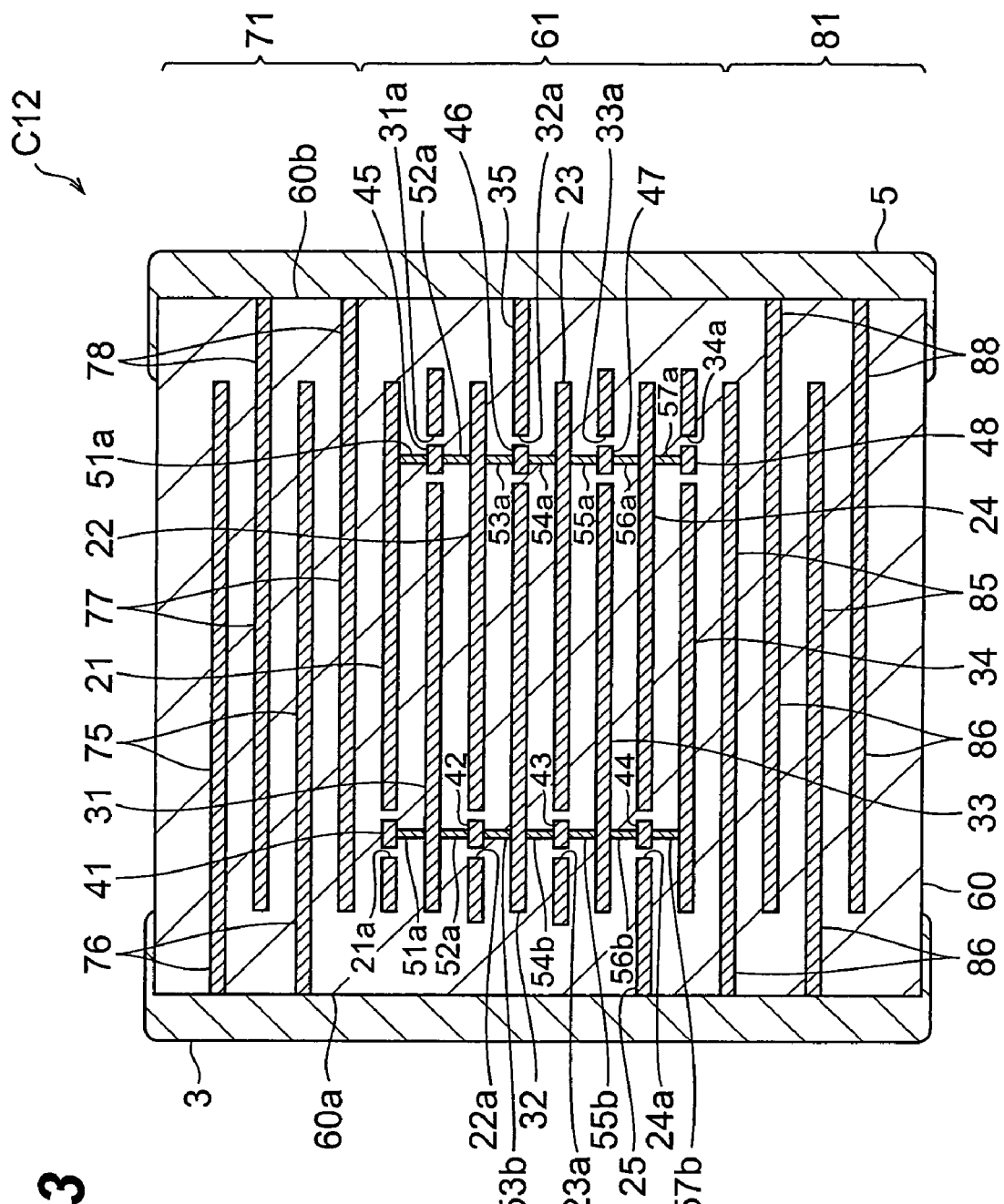
FIG. 23 is a view for explaining a cross-sectional configuration of the multilayer capacitor in accordance with a twelfth embodiment.
Figure 24:
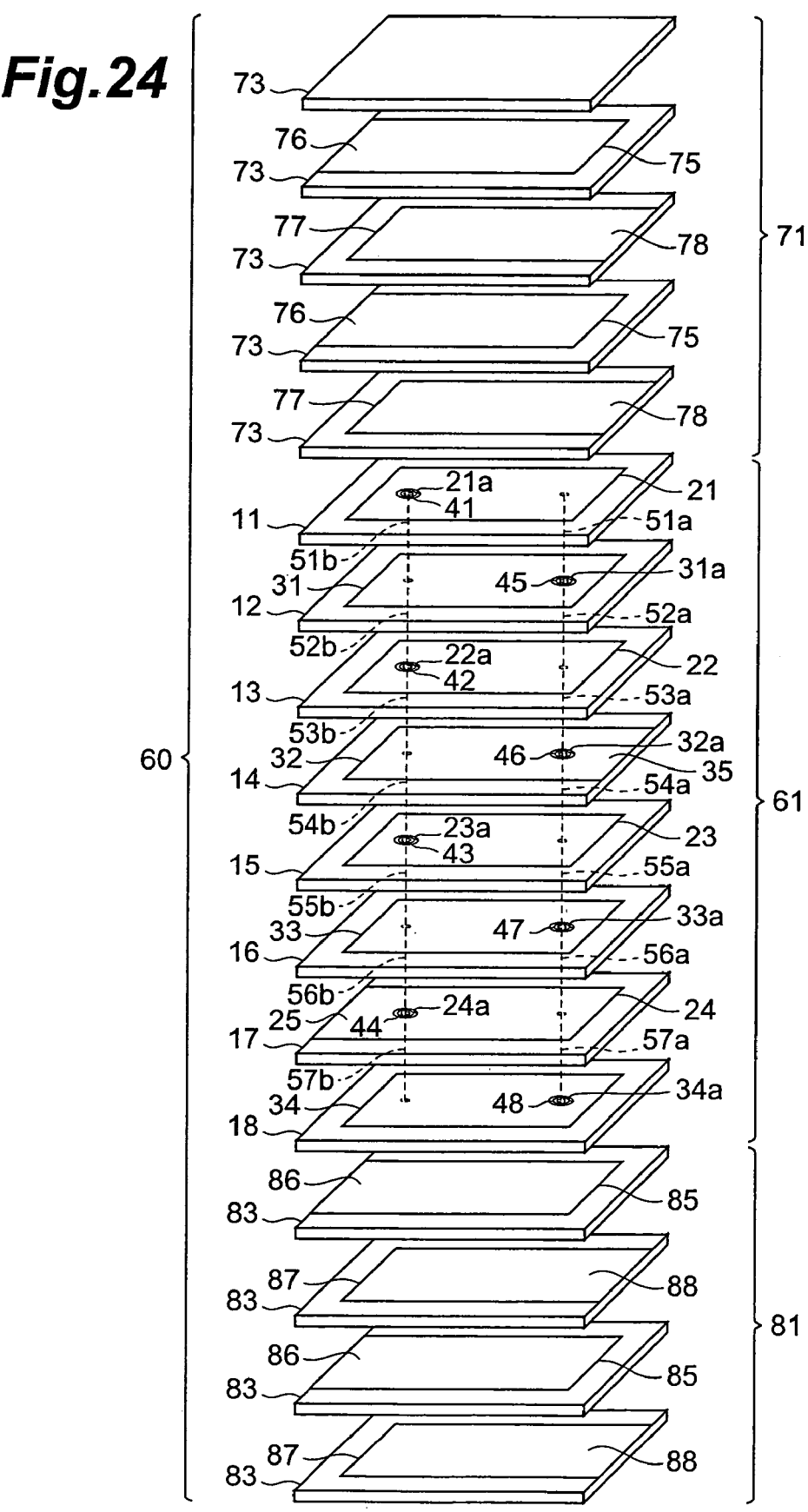
FIG. 24 is an exploded perspective view of the multilayer body included in the multilayer capacitor in accordance with the twelfth embodiment.

With reference to FIGS. 23 and 24, the structure of the multilayer capacitor C12 in accordance with a twelfth embodiment will be explained. The multilayer capacitor C12 in accordance with the twelfth embodiment differs from the multilayer capacitor C10 in accordance with the tenth embodiment in terms of configuration of the first capacitor portion 61. FIG. 23 is a view for explaining a cross-sectional configuration of the multilayer capacitor in accordance with the twelfth embodiment. FIG. 24 is an exploded perspective view of the multilayer body included in the multilayer capacitor in accordance with the twelfth embodiment.

The first capacitor portion 61 has the same configuration as with the multilayer body 1 in the multilayer capacitor C4 in accordance with the fourth embodiment except for the dielectric layer 19. Namely, the first capacitor portion 61 is constructed by alternately laminating a plurality of (8 in this embodiment) dielectric layers 11 to 18 and a plurality of (4 each in this embodiment) first and second internal electrodes 21 to 24, 31 to 34. Among the four first inner electrodes 21 to 24 in the first capacitor portion 61, one first inner electrodes 24 is electrically connected to the first terminal electrode 3 by way of the lead conductor 25. Among the four second inner electrodes 31 to 34 in the first capacitor portion 61, one second inner electrode 32 is electrically connected to the second terminal electrode 5 by way of the lead conductor 35.

Since the first capacitor portion 61 is provided as in the foregoing, this embodiment sets the equivalent series resistance of the magnetic layer capacitor C12 to a desirable value and thus can regulate the equivalent series resistance easily with a high precision as described in the fourth embodiment.

The first capacitor portion 61 may employ any of the configurations of the multilayer capacitors C1 to C3, C6, C8, and C9 in accordance with the first to third, sixth, eighth, and ninth embodiments (excluding the dielectric layer 19).

By adjusting at least one of the number and position in the laminating direction of inner electrodes directly connected to the terminal electrodes 3, 5 by way of the lead conductors 25, 35, the first to twelfth embodiments set the equivalent series resistances of their corresponding multilayer capacitors C1 to C12 to desirable values. As a result, the respective equivalent series resistances of the multilayer capacitors C1 to C12 can be regulated easily with a high precision.

The above-mentioned adjustment of the number of first inner electrodes 21 to 24 can be performed within the range of at least 1 but smaller than the total number of first inner electrodes 21 to 24 by 1. The above-mentioned adjustment of the number of second inner electrodes 31 to 34 can be performed within the range of at least 1 but smaller than the total number of second inner electrodes 31 to 34 by 1. The number of first inner electrodes directly connected to the terminal electrode 3 by way of the lead conductors 25 and the number of second inner electrodes directly connected to the terminal electrode 3 by way of the lead conductors 35 may differ from each other.

The number of through-hole conductors 51a to 57a, 51b to 57b may further be adjusted, so as to set the respective equivalent series resistances of the multilayer capacitors C1 to C12 to desirable values. This can regulate the respective equivalent series resistances of the multilayer capacitors C1 to C12 with a higher precision.

Figure 25:
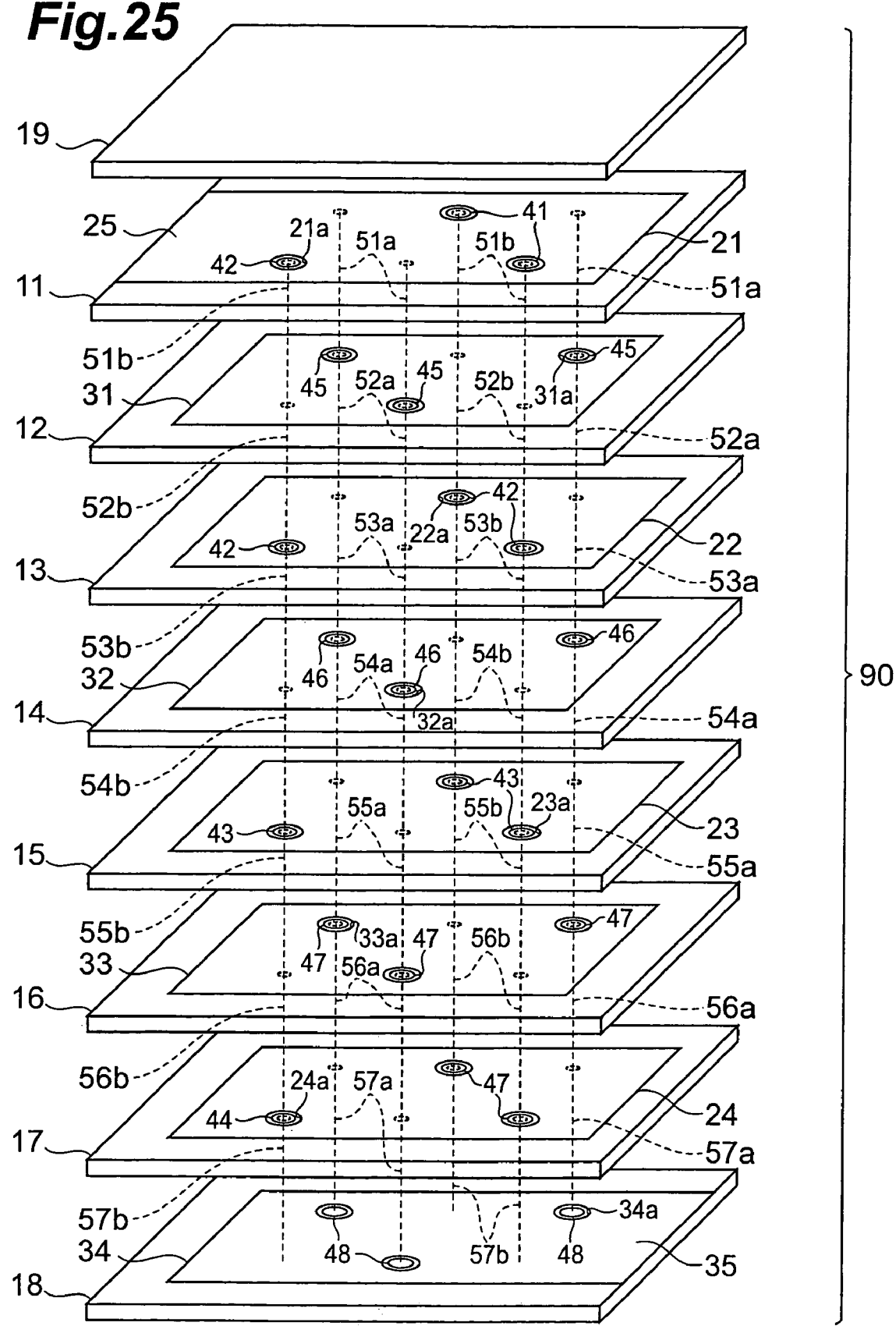
FIG. 25 is an exploded perspective view of a modified example of the multilayer body included in the multilayer capacitor in accordance with the first embodiment.

FIG. 25 shows an example of adjusting the number of through-hole conductors 51a to 57a, 51b to 57b. By employing three each of the through-hole conductors 51a to 57a, 51b to 57b, the multilayer body 90 of the multilayer capacitor shown in FIG. 25 sets the equivalent series resistance to a desirable value. Therefore, the first inner electrodes 21 to 24 are connected to each other by way of three conductive paths, and the second inner electrodes 31 to 34 are also connected to each other by way of three conductive paths.

Figure 26:
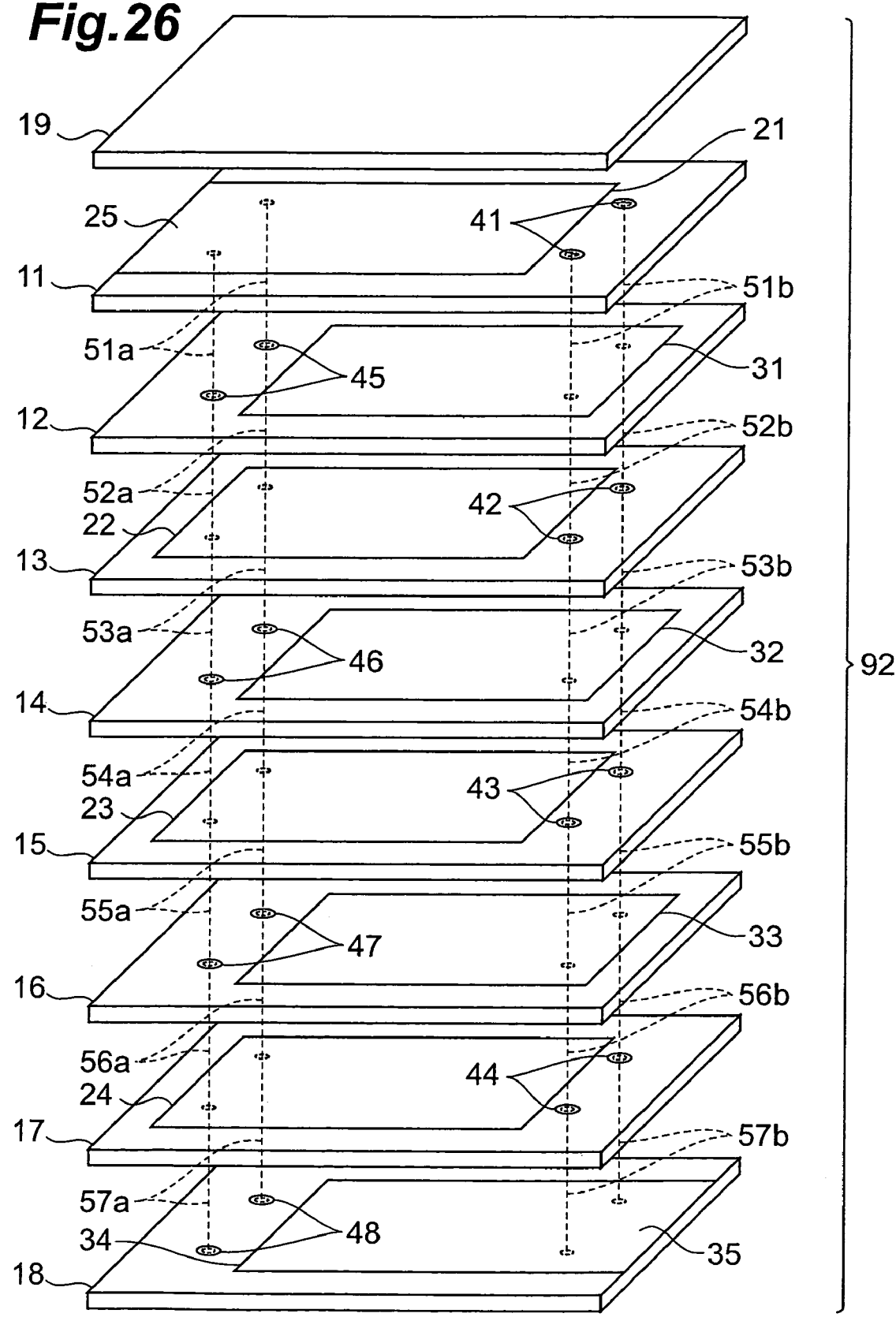
FIG. 26 is an exploded perspective view of a modified example of the multilayer body included in the multilayer capacitor in accordance with the first embodiment.

As shown in FIG. 26, the through-hole conductors 51a to 57a, 51b to 57b may be formed at positions on the outside of respective outer contours of the inner electrodes 21 to 24, 31 to 34 positioned on the dielectric layers 11 to 18 formed with the through-hole conductors 51a to 57a, 51b to 57b. By employing two each of the through-hole conductors 51a to 57a, 51b to 57b in the multilayer capacitor C1 in accordance with the first embodiment, the multilayer body 92 of the multilayer capacitor shown in FIG. 26 sets the equivalent series resistance to a desirable value. Therefore, the first inner electrodes 21 to 24 are connected to each other by way of two conductive paths, and the second inner electrodes 31 to 34 are also connected to each other by way of two conductive paths.

Though preferred embodiments of the present invention are explained in detail in the foregoing, the present invention is not limited to the above-mentioned embodiments and modified examples. For example, the number of laminated dielectric layers 11 to 19, 73, 83 and the number of laminated first and second inner electrodes 21 to 24, 75, 77, 31 to 34, 85, 87 are not restricted to those described in the above-mentioned embodiments. The number and position in the laminating direction of the inner electrodes directly connected to the terminal electrodes 3, 5 by way of the lead conductors 25, 35 are not limited to those described in the above-mentioned embodiments. The number and position in the laminating direction of first capacitor portions 61 are not limited to those described in the above-mentioned embodiments, either.

As shown in FIG. 27, the present invention may be employed in an array-like multilayer capacitor. The array-like multilayer capacitor includes a multilayer body 94, in which four capacitor portions are arranged in parallel.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multilayer capacitor comprising a multilayer body in which a plurality of dielectric layers and a plurality of inner electrodes are alternately laminated, and a plurality of terminal electrodes formed on the multilayer body;
   wherein the plurality of inner electrodes include a plurality of first inner electrodes and a plurality of second inner electrodes alternately arranged;
   wherein the plurality of terminal electrodes include first and second terminal electrodes electrically insulated from each other;
   wherein the plurality of first inner electrodes are electrically connected to each other by way of a first through-hole conductor;
   wherein the plurality of second inner electrodes are electrically connected to each other by way of a second through-hole conductor;
   wherein, in the plurality of first inner electrodes, at least one first inner electrode whose number is smaller than a total number of first inner electrodes by at least 1 is electrically connected to the first terminal electrode by way of a first lead conductor;
   wherein, in the plurality of second inner electrodes, at least one second inner electrode whose number is smaller than a total number of second inner electrodes by at least 1 is electrically connected to the second terminal electrode by way of a second lead conductor; and
   wherein an equivalent series resistance is set to a desirable value by adjusting each of the number of the at least one first inner electrode electrically connected to the first terminal electrode by way of the first lead conductor and the number of the at least one second inner electrode electrically connected to the second terminal electrode by way of the second lead conductor.

2. A multilayer capacitor according to claim 1, wherein each a number of first through-hole conductors electrically connecting the plurality of first inner electrodes to each other and a number of second through-hole conductors electrically connecting the plurality of second inner electrodes to each other is further adjusted, so as to set the equivalent series resistance to the desirable value.

3. A multilayer capacitor according to claim 1, wherein the plurality of first inner electrodes are connected in parallel; and
   wherein the plurality of second inner electrodes are connected in parallel.

4. A multilayer capacitor comprising a multilayer body in which a plurality of dielectric layers and a plurality of inner electrodes are alternately laminated, and a plurality of terminal electrodes formed on the multilayer body;

wherein the plurality of inner electrodes include a plurality of first inner electrodes and a plurality of second inner electrodes alternately arranged;

wherein the plurality of terminal electrodes include first and second terminal electrodes electrically insulated from each other;

wherein the plurality of first inner electrodes are electrically connected to each other by way of a first through-hole conductor;

wherein the plurality of second inner electrodes are electrically connected to each other by way of a second through-hole conductor;

wherein, in the plurality of first inner electrodes, at least one first inner electrode whose number is smaller than a total number of first inner electrodes by at least 1 is electrically connected to the first terminal electrode by way of a first lead conductor;

wherein, in the plurality of second inner electrodes, at least one second inner electrode whose number is smaller than a total number of second inner electrodes by at least 1 is electrically connected to the second terminal electrode by way of a second lead conductor; and wherein an equivalent series resistance is set to a desirable value by adjusting each of a position of the at least one first inner electrode electrically connected to the first terminal electrode by way of the first lead conductor in a laminating direction of the multilayer body and a position of the at least one second inner electrode electrically connected to the second terminal electrode by way of the second lead conductor in the laminating direction of the multilayer body.

5. A multilayer capacitor according to claim 4, wherein each of a number of first through-hole conductors electrically connecting the plurality of first inner electrodes to each other and a number of second through-hole conductors electrically connecting the plurality of second inner electrodes to each other is further adjusted, so as to set the equivalent series resistance to the desirable value.

6. A multilayer capacitor according to claim 4, wherein the plurality of first inner electrodes are connected in parallel; and wherein the plurality of second inner electrodes are connected in parallel.

7. A multilayer capacitor comprising a multilayer body in which a plurality of dielectric layers and a plurality of inner electrodes are alternately laminated, and a plurality of terminal electrodes formed on the multilayer body;

the multilayer capacitor having a capacitor portion including a first number of first inner electrodes and a second number of second inner electrodes alternately arranged as the plurality of inner electrodes;

wherein the plurality of terminal electrodes include first and second terminal electrodes electrically insulated from each other;

wherein the first number of first inner electrodes are electrically connected to each other by way of a first through-hole conductor;

wherein the second number of second inner electrodes are electrically connected to each other by way of a second through-hole conductor;

wherein, in the first number of first inner electrodes, at least one first inner electrode whose number is smaller than the first number by at least 1 is electrically connected to the first terminal electrode by way of a first lead conductor;

wherein, in the second number of second inner electrodes, at least one second inner electrode whose number is smaller than the second number by at least 1 is electrically connected to the second terminal electrode by way of a second lead conductor; and wherein an equivalent series resistance is set to a desirable value by adjusting each of the number of the at least one first inner electrode electrically connected to the first terminal electrode by way of the first lead conductor and the number of the at least one second inner electrode electrically connected to the second terminal electrode by way of the second lead conductor.

8. A multilayer capacitor according to claim 7, wherein each of a number of first through-hole conductors electrically connecting the plurality of first inner electrodes to each other and a number of second through-hole conductors electrically connecting the plurality of second inner electrodes to each other is further adjusted, so as to set the equivalent series resistance to the desirable value.

9. A multilayer capacitor according to claim 7, wherein the first number of first inner electrodes are connected in parallel; and wherein the second number of second inner electrodes are connected in parallel.

10. A multilayer capacitor comprising a multilayer body in which a plurality of dielectric layers and a plurality of inner electrodes are alternately laminated, and a plurality of terminal electrodes formed on the multilayer body;

the multilayer capacitor having a capacitor portion including a first number of first inner electrodes and a second number of second inner electrodes alternately arranged as the plurality of inner electrodes;

wherein the plurality of terminal electrodes include first and second terminal electrodes electrically insulated from each other;

wherein the first number of first inner electrodes are electrically connected to each other by way of a first through-hole conductor;

wherein the second number of second inner electrodes are electrically connected to each other by way of a second through-hole conductor;

wherein, in the first number of first inner electrodes, at least one first inner electrode whose number is smaller than the first number by at least 1 is electrically connected to the first terminal electrode by way of a first lead conductor;

wherein, in the second number of second inner electrodes, at least one second inner electrode whose number is smaller than the second number by at least 1 is electrically connected to the second terminal electrode by way of a second lead conductor; and wherein an equivalent series resistance is set to a desirable value by adjusting each of a position of the at least one first inner electrode electrically connected to the first terminal electrode by way of the first lead conductor in a laminating direction of the multilayer body and a position of the at least one second inner electrode electrically connected to the second terminal electrode by way of the second lead conductor in the laminating direction of the multilayer body.

11. A multilayer capacitor according to claim 10, wherein each of a number of first through-hole conductors electrically connecting the plurality of first inner electrodes to each other and a number of second through-hole conductors electrically connecting the plurality of second inner electrodes to each other is further adjusted, so as to set the equivalent series resistance to the desirable value.

12. A multilayer capacitor according to claim 10, wherein the first number of first inner electrodes are connected in parallel; and wherein the second number of second inner electrodes are connected in parallel.

13. A method of adjusting an equivalent series resistance of a multilayer capacitor comprising a multilayer body in which a plurality of dielectric layers and a plurality of inner electrodes are alternately laminated, and a plurality of terminal electrodes formed on the multilayer body;

wherein the plurality of inner electrodes include a plurality of first inner electrodes and a plurality of second inner electrodes alternately arranged;

wherein the plurality of terminal electrodes include first and second terminal electrodes electrically insulated from each other;

the method comprising the steps of:

electrically connecting the plurality of first inner electrodes to each other by way of a first through-hole conductor;

electrically connecting the plurality of second inner electrodes to each other by way of a second through-hole conductor;

electrically connecting, in the plurality of first inner electrodes, at least one first inner electrode whose number is smaller than a total number of first inner electrodes by at least 1 to the first terminal electrode by way of a first lead conductor;

electrically connecting, in the plurality of second inner electrodes, at least one second inner electrode whose number is smaller than a total number of second inner electrodes by at least 1 to the second terminal electrode by way of a second lead conductor; and setting the equivalent series resistance to a desirable value by adjusting each of the number of the at least one first inner electrode electrically connected to the first terminal electrode by way of the first lead conductor and the number of the at least one second inner electrode electrically connected to the second terminal electrode by way of the second lead conductor.

14. A method of adjusting an equivalent series resistance of a multilayer capacitor comprising a multilayer body in which a plurality of dielectric layers and a plurality of inner electrodes are alternately laminated, and a plurality of terminal electrodes formed on the multilayer body;

wherein the plurality of inner electrodes include a plurality of first inner electrodes and a plurality of second inner electrodes alternately arranged;

wherein the plurality of terminal electrodes include first and second terminal electrodes electrically insulated from each other;

the method comprising the steps of:

electrically connecting the plurality of first inner electrodes to each other by way of a first through-hole conductor;

electrically connecting the plurality of second inner electrodes to each other by way of a second through-hole conductor;

electrically connecting, in the plurality of first inner electrodes, at least one first inner electrode whose number is smaller than a total number of first inner electrodes by at least 1 to the first terminal electrode by way of a first lead conductor;

electrically connecting, in the plurality of second inner electrodes, at least one second inner electrode whose number is smaller than a total number of second inner electrodes by at least 1 to the second terminal electrode by way of a second lead conductor; and setting the equivalent series resistance to a desirable value by adjusting each of a position of the at least one first inner electrode electrically connected to the first terminal electrode by way of the first lead conductor in a laminating direction of the multilayer body and a position of the at least one second inner electrode electrically connected to the second terminal electrode by way of the second lead conductor in the laminating direction of the multilayer body.

15. A method of adjusting an equivalent series resistance of a multilayer capacitor comprising a multilayer body in which a plurality of dielectric layers and a plurality of inner electrodes are alternately laminated, and a plurality of terminal electrodes formed on the multilayer body;

the multilayer capacitor having a capacitor portion including a first number of first inner electrodes and a second number of second inner electrodes alternately arranged as the plurality of inner electrodes;

wherein the plurality of terminal electrodes include first and second terminal electrodes electrically insulated from each other;

the method comprising the steps of:

electrically connecting the first number of first inner electrodes to each other by way of a first through-hole conductor;

electrically connecting the second number of second inner electrodes to each other by way of a second through-hole conductor;

electrically connecting, in the first number of first inner electrodes, at least one first inner electrode whose number is smaller than the first number by at least 1 to the first terminal electrode by way of a first lead conductor;

electrically connecting, in the second number of second inner electrodes, at least one second inner electrode whose number is smaller than the second number by at least 1 to the second terminal electrode by way of a second lead conductor; and setting the equivalent series resistance to a desirable value by adjusting each of the number of the at least one first inner electrode electrically connected to the first terminal electrode by way of the first lead conductor and the number of the at least one second inner electrode electrically connected to the second terminal electrode by way of the second lead conductor.

16. A method of adjusting an equivalent series resistance of a multilayer capacitor comprising a multilayer body in which a plurality of dielectric layers and a plurality of inner electrodes are alternately laminated, and a plurality of terminal electrodes formed on the multilayer body;

the multilayer capacitor having a capacitor portion including a first number of first inner electrodes and a second number of second inner electrodes alternately arranged as the plurality of inner electrodes;

wherein the plurality of terminal electrodes include first and second terminal electrodes electrically insulated from each other;

the method comprising the steps of:

electrically connecting the first number of first inner electrodes to each other by way of a first through-hole conductor;

electrically connecting the second number of second inner electrodes to each other by way of a second through-hole conductor;

electrically connecting, in the first number of first inner electrodes, at least one first inner electrode whose number is smaller than the first number by at least 1 to the first terminal electrode by way of a first lead conductor;

electrically connecting, in the second number of second inner electrodes, at least one second inner electrode whose number is smaller than the second number by at least 1 to the second terminal electrode by way of a second lead conductor; and setting the equivalent series resistance to a desirable value by adjusting each of a position of the at least one first inner electrode electrically connected to the first terminal electrode by way of the first lead conductor in a laminating direction of the multilayer body and a position of the at least one second inner electrode electrically connected to the second terminal electrode by way of the second lead conductor in the laminating direction of the multilayer body.

* * * * *